(12) United States Patent
McMurtry et al.

(10) Patent No.: US 10,816,335 B2
(45) Date of Patent: Oct. 27, 2020

(54) COORDINATE POSITIONING MACHINE

(71) Applicant: RENISHAW PLC, Wotton-under-Edge, Gloucestershire (GB)

(72) Inventors: David Roberts McMurtry, Stancombe (GB); Stephen Mark Angood, Dursley (GB); Colin Ray Bulled, Crediton (GB); David James Fook, Exeter (GB); Marcus James Eales, Stroud (GB); Christopher Kemp, Wotton-under-Edge (GB)

(73) Assignee: RENISHAW PLC, Wotton-Under-Edge (GB)

( * ) Notice: Subject to any disclaimer, the term of this patent is extended or adjusted under 35 U.S.C. 154(b) by 379 days.

(21) Appl. No.: 15/744,326

(22) PCT Filed: Aug. 4, 2016

(86) PCT No.: PCT/GB2016/052392
§ 371 (c)(1),
(2) Date: Jan. 12, 2018

(87) PCT Pub. No.: WO2017/021733
PCT Pub. Date: Feb. 9, 2017

(65) Prior Publication Data
US 2018/0209788 A1    Jul. 26, 2018

(30) Foreign Application Priority Data
Aug. 5, 2015   (GB) .................................. 1513850.6

(51) Int. Cl.
*G01B 21/04*     (2006.01)
*G01B 5/00*      (2006.01)
*B23Q 1/54*      (2006.01)

(52) U.S. Cl.
CPC ......... *G01B 21/047* (2013.01); *B23Q 1/5462* (2013.01); *G01B 5/0004* (2013.01); *G01B 5/0016* (2013.01); *G01B 21/045* (2013.01)

(58) Field of Classification Search
CPC .... G01B 5/012; G01B 21/042; G01B 21/045; G01B 7/012; G01B 5/0016; G01B 21/04;
(Continued)

(56) References Cited

U.S. PATENT DOCUMENTS

| 2,789,480 A | 4/1957 | Wellauer |
| 4,445,596 A | 5/1984 | Waters et al. |

(Continued)

FOREIGN PATENT DOCUMENTS

| CN | 104015186 A | 9/2014 |
| DE | 102006027898 B3 | 7/2007 |

(Continued)

OTHER PUBLICATIONS

Sep. 22, 2016 Search Report issued in British Patent Application No. GB1513850.6.

(Continued)

*Primary Examiner* — Yaritza Guadalupe-McCall
(74) *Attorney, Agent, or Firm* — Oliff PLC

(57) ABSTRACT

A non-Cartesian coordinate positioning machine is provided that comprises an extendable leg assembly for positioning a component such as a measurement probe within a working volume of the machine, and a constraint member associated with the extendable leg assembly for providing a predetermined part of the extendable leg assembly with substantially a same orientation relative to gravity for a same position of the component within the working volume. In a preferred embodiment, the orientation relative to gravity is maintained substantially constant, so that a plane defined by the prede- (Continued)

termined part is substantially aligned with gravity, as the component is moved around the working volume.

33 Claims, 16 Drawing Sheets

(58) Field of Classification Search
CPC .... G01B 21/047; G01B 5/004; G01B 11/272; G01B 3/30; G01B 5/0002; G01B 5/0004; G01B 5/008; G01B 5/0014; G01B 2210/58; G01B 3/002
USPC .......................................................... 33/503
See application file for complete search history.

(56) References Cited

U.S. PATENT DOCUMENTS

| | | | |
|---|---|---|---|
| 4,820,946 A | 4/1989 | Gutbrod | |
| 4,976,582 A * | 12/1990 | Clavel | B25J 9/1065 |
| | | | 108/138 |
| 4,988,244 A * | 1/1991 | Sheldon | B23Q 1/5462 |
| | | | 248/631 |
| 5,028,180 A | 7/1991 | Sheldon et al. | |
| 5,057,728 A | 10/1991 | Dammeyer et al. | |
| 5,428,446 A | 6/1995 | Ziegert et al. | |
| 5,631,510 A | 5/1997 | Flaig et al. | |
| 5,715,729 A * | 2/1998 | Toyama | B23Q 1/5462 |
| | | | 408/234 |
| 5,797,191 A | 8/1998 | Ziegert | |
| 5,813,287 A | 9/1998 | McMurtry et al. | |
| 5,887,356 A | 3/1999 | Sheldon | |
| 5,940,180 A | 8/1999 | Ostby | |
| 5,941,128 A * | 8/1999 | Toyama | B25J 17/0208 |
| | | | 403/53 |
| 6,330,837 B1 | 12/2001 | Charles et al. | |
| 7,241,070 B2 * | 7/2007 | McMurtry | B25J 17/0266 |
| | | | 269/75 |
| 10,369,692 B2 * | 8/2019 | Nakanishi | B25J 9/102 |
| 10,427,294 B2 * | 10/2019 | Hongo | F16H 21/02 |
| 10,539,452 B2 * | 1/2020 | Taira | B25J 19/02 |
| 2003/0005786 A1 | 1/2003 | Stuart et al. | |
| 2005/0166413 A1 | 8/2005 | Crampton | |
| 2009/0194664 A1 | 8/2009 | Evans et al. | |
| 2010/0018153 A1 | 1/2010 | Garau | |
| 2010/0122602 A1 | 5/2010 | Marcroft et al. | |
| 2014/0263883 A1 | 9/2014 | Rushworth et al. | |
| 2015/0176956 A1 | 6/2015 | Pettersson et al. | |
| 2015/0343631 A1 * | 12/2015 | Martinez-Esponda | B25J 9/0051 |
| | | | 74/490.03 |
| 2017/0363403 A1 * | 12/2017 | Jonas | G01B 5/012 |
| 2018/0209788 A1 * | 7/2018 | McMurtry | G01B 21/047 |
| 2018/0224272 A1 * | 8/2018 | Wooldridge | G01B 21/047 |
| 2019/0072373 A1 * | 3/2019 | Iseli | G01B 21/047 |
| 2019/0107383 A1 * | 4/2019 | Ruck | G01B 7/012 |
| 2019/0145748 A1 * | 5/2019 | Angood | G01B 5/0002 |

FOREIGN PATENT DOCUMENTS

| | | |
|---|---|---|
| EP | 0589565 A2 | 3/1994 |
| EP | 0674969 A1 | 10/1995 |
| EP | 2705935 A1 | 3/2014 |
| EP | 3054265 A1 | 8/2016 |
| GB | 316770 A | 8/1929 |
| GB | 1337314 A | 11/1973 |
| GB | 1403017 A | 8/1975 |
| JP | 2007-312501 A | 11/2007 |
| WO | 87/07711 A1 | 12/1987 |
| WO | 89/09887 A1 | 10/1989 |
| WO | 91/03145 A1 | 3/1991 |
| WO | 92/17313 A2 | 10/1992 |
| WO | 95/14905 A1 | 6/1995 |
| WO | 95/20747 A1 | 8/1995 |
| WO | 03/006837 A1 | 1/2003 |
| WO | 2004063579 A1 | 7/2004 |
| WO | 2004096502 A1 | 11/2004 |
| WO | 2007/144573 A1 | 12/2007 |
| WO | 2007/144585 A2 | 12/2007 |
| WO | 2007/144587 A1 | 12/2007 |
| WO | 2007/144602 A1 | 12/2007 |
| WO | 2007/144603 A2 | 12/2007 |
| WO | 2009/079781 A1 | 7/2009 |
| WO | 2010/106079 A1 | 9/2010 |
| WO | 2016/195176 A1 | 12/2016 |

OTHER PUBLICATIONS

Jan. 5, 2017 International Search Report issued in International Patent Application No. PCT/GB2016/052392.

Jan. 5, 2017 Written Opinion issued in International Patent Application No. PCT/GB2016/052392.

Ziegert; "Design and Testing of a High Speed, 5-DOF, Coordinate Measuring Machine With Parallel Kinematic Structure"; Department of Mechanical Engineering; University of Florida; pp. 1-4.

* cited by examiner

COORDINATE POSITIONING MACHINE

The present invention relates to a coordinate positioning machine, and in particular to a non-Cartesian coordinate positioning machine such as a hexapod coordinate positioning machine. Coordinate positioning machines include, for example, coordinate measuring machines (CMMs) and machine tools.

As illustrated schematically in FIG. 1 of the accompanying drawings, a non-Cartesian coordinate positioning machine 1 generally comprises first and second stages or platforms 2, 4 that are supported and moved relative to each other by a plurality of telescopic or extendable legs 6 provided between them. The extendable legs 6 are sometimes also referred to as struts or rams, and where there are six such extendable legs 6 (as illustrated in FIG. 1), the machine is commonly called a hexapod.

The extendable legs 6 are typically mounted on the platforms 2, 4 via ball joints 8, with each leg 6 either having its own ball joint 8 at one or both ends thereof (as illustrated in FIG. 1), or sharing a ball joint 8 with an adjacent leg 6 at one or both ends.

Various relative positions and orientations between the first and second platforms 2, 4 can be achieved by extending the legs 6 by differing amounts, as illustrated in FIG. 1 by arrows 7. The relative position and orientation at any instant is monitored by a plurality of length-measuring transducers 10, for example with one transducer being associated with each extendable leg 6. The length-measuring transducer may comprise an encoder scale paired with a readhead.

One of the platforms 2, 4 is typically provided as part of a fixed structure of the positioning machine 1, with the other of the platforms 4, 2 moving 5, 3 relative to the fixed structure. A component (for example a probe or a tool) can be mounted on the moving platform and a workpiece mounted to the fixed structure, or vice versa, to enable an operation to be performed on the workpiece (for example measuring, probing, or scanning in the case of a coordinate measuring machine, or machining in the case of a machine tool).

For example, as illustrated in FIG. 1, the lower platform 4 is fixed and the upper platform 2 is moveable, with a workpiece 12 mounted on the lower platform 4 and a probe component 14 mounted on the upper platform 2. A working volume 9 is defined between the upper platform 2 and the lower platform 4, with the probe component 14 being positioned in the working volume 9 by operation of the extendible legs 6. Although a vertical arrow 3 is shown to indicate movement, with appropriate control of the various legs 6 the platform 2 will of course also be moveable horizontally and could also be tiltable.

Alternatively, the upper platform 2 could be fixed and the lower platform 4 moveable, with a probe mounted to a lower surface of the lower platform 4 and a workpiece mounted to a part of the fixed structure below that, so that the working volume (or operating volume) of the machine is below the lower platform 4 rather than between the upper and lower platforms 2, 4.

Various types of non-Cartesian coordinate positioning machine are described in more detail in WO 91/03145, WO 95/14905, WO 95/20747, WO 92/17313, WO 03/006837, WO 2004/063579, WO 2007/144603, WO 2007/144573, WO 2007/144585, WO 2007/144602 and WO 2007/144587.

For example, WO 91/03145 describes a hexapod machine tool comprising an upper, moveable, platform that is attached to a base by six hydraulic extendable legs, similar in principle to that illustrated in FIG. 1 described above. The extendable legs are attached to the base and moveable platform via ball joints. The extendable legs are hydraulic and comprise a piston rod that is moveable within a cylinder. The amount of leg extension is measured by mounting a magnetic scale to the cylinder and a suitable readhead on the piston rod. Extension of the leg thus causes the scale to move past the readhead thereby allowing the length of the leg to be measured. A computer controller acts to set the length of each leg to provide the required platform movement.

As with any metrology apparatus, positional accuracy and repeatability are important, and various schemes have previously been proposed in order to improve positional accuracy and repeatability in a non-Cartesian coordinate positioning machine.

For example, WO 2007/144573 recognises that load forces that occur in the apparatus during use may introduce distortions into metrology elements of the apparatus, thereby leading to positional inaccuracies. Therefore, WO 2007/144573 describes an improvement to WO 91/03145, in which a position measurement apparatus is provided with a metrology frame that is separate from the thrust frame. Any load forces that may occur in the load-bearing structure are thereby not passed through to the metrology structure, thus preventing any substantial distortion of the metrology frame and thereby ensuring measurement accuracy is not degraded. The separation of the load-bearing structure from the metrology structure applies to each of the six extendable legs, with each leg being provided with have a load-bearing outer structure and a metrology inner structure, with the metrology structure of the legs being mechanically isolated from the load-bearing structure. This is apparent particularly from FIG. 3 of WO 2007/144573.

WO 95/14905 describes a variant of the above described hexapod apparatus in which the length of each extendable leg is measured interferometrically.

According to a first aspect of the present invention, there is provided a non-Cartesian coordinate positioning machine comprising: an extendable leg assembly for positioning a component within a working volume of the machine; and a constraint member associated with the extendable leg assembly for providing a predetermined part of the extendable leg assembly with substantially a same orientation relative to gravity for a same position of the component in the working volume.

The component may comprise a metrology component or metrology instrument, such as a measurement probe. The predetermined part may comprise a metrology element, such as a metrology element that is used for measuring a separation between ends of the extendable leg assembly, or some other length associated with the extendable leg assembly.

One such example of a metrology element is an encoder scale. Where the metrology element is an encoder scale, an embodiment of the present invention can be used to prevent or at least reduce movements of the extendable leg assembly which may cause the encoder scale to be subject to stresses and strains that are likely to affect metrology measurements using the encoder scale.

The benefit of the invention in relation to the specific example of an encoder scale will now be described in more detail.

In prior art hexapod apparatus of the type described further above, the extendable legs typically comprise pistons or electronic drive motors that act to extend and retract each leg as required. Typically, each leg also comprises some means for measuring the amount of leg extension. For example, as mentioned above, WO 91/03145 describes hydraulic extendable legs that comprise a piston rod moveable within a cylinder. The amount of leg extension is measured by mounting a magnetic scale to the cylinder and a suitable readhead on the piston rod. Extension or retraction of the leg thus causes the scale to move past the readhead thereby allowing the length of the leg to be determined.

The present applicant has appreciated a key disadvantage of arrangements of the type described in WO 91/03145. Since the scale is affixed to an outer surface of the cylinder, bending of the cylinder due to gravity is likely to cause distortion of the scale. Furthermore, the amount and type of scale distortion will depend on exactly where and in what orientation the scale is affixed.

This problem is illustrated in FIGS. 2 and 3 of the accompanying drawings. If the scale 10 is mounted to an upper surface of the extendable leg 6, as illustrated in FIG. 2A, bending due to gravity will cause the upper surface (and scale) to contract, as illustrated in FIG. 2B. The scale markings will, as a result, be more closely spaced, leading to errors in the measurement of length (a higher amount of relative movement between telescoping sections of the extendable leg will be measured than is actually the case).

If the scale 10 is instead mounted to a lower surface of the extendable leg 6, as illustrated in FIG. 3A, bending due to gravity will cause the lower surface (and scale) to stretch, as illustrated in FIG. 3B. The scale markings will, as a result, be more widely spaced, leading to errors in the measurement of length (a lower amount of relative movement between telescoping sections of the extendable leg will be measured than is actually the case).

To make matters worse, the orientation of the encoder scale 10 will change as the extendible legs 6 are adjusted to move one or both platforms 2, 4, and thereby the component (e.g. probe 14), around the working volume.

Although the scheme described in WO 95/14905 reduces some gravitational effects by providing measurement down the centre of the member (the neutral axis), and WO 2007/144573 does so by isolating the load bearing structure from the metrology structure, such arrangements are complicated and expensive to implement.

In contrast, an extendable leg assembly embodying the present invention offers a relatively straightforward and inexpensive solution to the above problem by use of a constraint member to constrain or control the orientation of the encoder scale. The constraint member can be used to provide the encoder scale (or a plane defined by the encoder scale) with substantially the same orientation relative to gravity for all positions of the component within the working volume. In particular, the constraint member can be arranged to keep the encoder scale in a vertical plane as the component is moved around the working volume. In doing so, the problem caused by bending of the extendible leg is overcome or at least significantly reduced. This is because a side-facing surface will experience some contraction at the top and some stretching at the bottom, with a neutral axis that is substantially unaffected. The encoder scale can be arranged along the neutral axis. Although the encoder scale has a finite area, and will be affected off the neutral axis, the overall effect is neutral. This overcomes the problem described with reference to FIG. 3.

In the above-described scenario, the constraint member is arranged to provide the predetermined part (the encoder scale or the plane of the encoder scale) with a substantially constant orientation relative to gravity. However, in other embodiments of the present invention the predetermined part need not necessarily have the same (or a fixed or a constant) orientation relative to gravity for all positions of the component in the working volume; it is merely required that the predetermined part has the same orientation relative to gravity for the same position.

In this respect, a varying (but repeatable) orientation relative to gravity is beneficial, for example, where the coordinate positioning machine is used as a comparator rather than as a coordinate measuring machine. With a comparator, measurements of a part are compared with measurements of a reference part in the same position and orientation in the working volume. By ensuring that the predetermined part has the same orientation relative to gravity for the same position, the gravitational effect described above with reference to FIG. 3 will be the same for each position of the probe within the working volume and will effectively cancel when a comparison (or difference) is made.

Therefore, for a comparator it is more important that the orientation of the encoder scale relative to gravity is repeatable than that the orientation of the encoder scale relative to gravity is fixed. On the other hand, where the coordinate positioning machine is a coordinate measuring machine, it is more important that the orientation of the predetermined part (e.g. encoder scale) is fixed relative to gravity (e.g. aligned with gravity), since absolute measurement accuracy is important. In being fixed, the orientation is also by definition repeatable.

The use of a constraint member in an embodiment of the present invention therefore ensures that, as the component is moved around the working volume from position to position, the predetermined part of the extendable leg assembly (e.g. the encoder scale) will have an orientation relative to gravity that is repeatable for each position. In other words, if the component is moved from a first position to a second position and then back to the first position, the predetermined part will have substantially the same orientation relative to gravity in the first position both before and after the move to the second position. The constraint member therefore ensures that the predetermined part has substantially a same orientation relative to gravity for a same position of the component at different times as the component is moved around the working volume.

The orientation may be that of a plane defined by the predetermined part, for example a planar or plane-like surface of the predetermined part. The orientation of a plane may conveniently be defined by the normal to the plane. In this respect, a plane can be defined by a point (which sets the position of the plane) and a normal vector (which sets the orientation of the plane). Therefore, stating herein that a plane is aligned with gravity is equivalent to stating that a normal to the plane is normal to the direction of gravity, or that the plane is oriented (its normal vector is pointing) at right angles to gravity.

It will be appreciated that the present invention will provide some benefit even where the orientation relative to gravity is not exactly fixed or not exactly repeatable. Some differences in the orientation for different visits of the component to the same position may be allowed, where those differences are acceptable or tolerable for the application concerned (e.g. the measuring accuracy required). In other words, some 'play' or tolerance in the constraint may be generally acceptable. It is preferable that the orientations relative to gravity for a same position are within 10% of each other (maximum value minus minimum value divided by minimum value, expressed as a percentage), more preferably within 5% of each other, more preferably within 2% of each other, more preferably within 1% of each other; what is acceptable will depend on the application and the accuracy required.

It will be appreciated that the present invention is also applicable where the predetermined part is made to have substantially the same orientation relative to a reference direction other than gravity, for example a reference direction defined by predetermined features of the machine rather than by an external gravitational field. For example, the predetermined features of the machine may be ones that would be oriented substantially vertically in use, such as a support or frame member. Or, where there is another force acting on the system, the reference direction may be the direction of that force. For example, there may be an application of the invention where the reference direction is substantially horizontal.

The predetermined part may comprise a measurement device, such as a length-measuring device, or at least part thereof. The predetermined part may interact (or cooperate) at a measurement location with a further part of the machine to provide a measurement relating to the extendable leg assembly, or at least a signal from which such a measurement may be derived. The predetermined part and further part may together form a transducer. The measurement may be a length of or associated with the extendable leg assembly. Such a measurement may be used to determine the position of the component in the working volume. The predetermined part may comprise a scale, with the further part comprising a scale reader. The further part may be a part of the extendible leg assembly.

The extendable leg assembly may comprise first and second members which move relative to one another when the extendable leg assembly changes length. For example, the first and second members may slide over or past one another, for example telescopically. The first and second members may together form an elongate member of the extendable leg assembly. The predetermined part of the extendable leg assembly may be provided on (or by or form part of) the first member, with the further part provided on (or by or forming part of) the second member.

The extendable leg assembly may be supported (or held) in the machine by at least one support, such as at an end (or joint) of the extendable leg assembly. The extendable leg assembly may be provided between first and second platforms of the machine, with the first and second platforms being positioned relative to each other by the extendable leg assembly. The component may be attached to one of the first and second platforms. One of the first and second platforms may be fixed (stationary), with the component being attached to the other of the first and second platforms. A weight of the moving platform may be at least partially (and preferably substantially completely) supported by a counterbalance arrangement. The term platform is a broad term to describe any type of structure, and is not intended to imply any limitations as to form and shape.

The measurement location may be spaced away or apart from the or each support. With such an arrangement, the extendable leg assembly is at least to some extent unsupported (or self-supporting) at the measurement location, and therefore subject at least to some extent to gravitationally-induced bending at the measurement location (and vulnerable, in the absence of the present invention, to the types of technical problem described above with reference to FIG. 3, due to stresses caused by bending of the elongate member due to gravity). The spacing between the measurement location and at least one of the at least one support may vary as the component moves around the working volume (and as the length of the extendable leg assembly varies).

The extendable leg assembly may be supported (e.g. held) by first and second supports at first and second positions respectively, for example at first and second ends of the extendable leg assembly. The measurement location may be arranged between the first and second positions. The measurement location may be spaced apart from both of the first and second positions. The spacing between the measurement location and at least one of the first and second positions may vary as the component moves around the working volume (and as the length of the extendable leg assembly varies).

For at least one position of the component in the working volume (or for at least one extension or length of the extendible leg assembly, such as fully extended), the measurement location may be spaced apart from at least a closest one of the at least one support (e.g. spaced apart from one or both of the first and second positions) by at least five times a width (or diameter) of an elongate member on or by which the predetermined part is provided, or at least 10 times that width, or at least 25 times that width, or at least 50 times that width. For at least one position of the component in the working volume (or for at least one extension or length of the extendible leg assembly, such as fully extended), the measurement location may be spaced apart from at least a closest one of the at least one support (e.g. spaced apart from one or both of the first and second positions) by at least 10% of an overall length of the extendible member (or extendible leg assembly) for that position of the component in the working volume, or at least a quarter of the overall length, or at least a third of the overall length, or approximately (e.g. within 10% of) half of the overall length.

For example, the width or diameter of an elongate member of the extendable leg assembly, on or by which the predetermined part is provided, may be around 8 mm. The elongate member may be enclosed in a shell, the outside diameter of which may be around 35 mm. The length of the extendible leg assembly may vary between around 500 mm long and around 850 mm as the component moves around the working volume. It is to be understood that these values are purely by way of example and not limiting on the invention in any way.

It is to be appreciated that, where it is described herein that the component is moved to a particular position in the working volume, this could be by way of drive means provided by the coordinate positioning machine, for example as part of or at least associated with the extendible leg assembly itself, or this could be by way of some external influence, for example manual positioning of the component by an operator.

Also, where it is described that the extendable leg assembly is for positioning the component within the working volume, this is to be understood as meaning either setting the position of the component within the working volume (by actively moving the component to that position) or determining the position of the component within the working volume (the component having been moved to that position by whatever means), or a combination of these. In either case, positioning the component within the working volume is associated with moving the component around the working volume, and is not intended to cover merely determining the position of a static component (e.g. a workpiece) placed within the working volume.

The component may be attached directly or indirectly to and/or move with an end of the extendable leg assembly, so that the component can be moved around the working volume by operation of the extendable leg assembly. The component may be a measurement probe, or a part thereof (such as a stylus or a stylus tip). The component may be a tool, or a part thereof, such as a tool typically found in a machine tool for shaping or machining metal or other rigid materials. The component can even be considered to be a part, for example a moveable end, of the extendable leg assembly itself, for example defined by a ball joint at that end.

By a same position of the component within the working volume it is meant that the component has substantially a same position and orientation (defined by all six degrees of freedom). In the same position, the component will occupy substantially the same volume.

Furthermore, the term 'working volume' is intended to mean only that part of the working volume over which the present invention has effect. For example, the constraint described may not operate over the entire volume in which the component is physically able to move via the extendable leg assembly, but may operate (or may operate effectively) only over a part thereof. The term 'working volume' is to be construed accordingly, and should be read as 'at least part of the working volume' where appropriate.

The constraint member may be adapted to constrain rotation of the predetermined part relative to a plane defined by the constraint member when the extendable leg assembly is arranged in the machine.

The extendable leg assembly may comprise an extendible elongate member, with the predetermined part being moveable with the extendible elongate member. The predetermined part may be attached to (or affixed to, or formed as part of, or defined by) the elongate member. The predetermined part may be attached at or near a centre of the surface of the elongate member, or along a line running down a middle of the surface.

The constraint member may be attachable to the elongate member and to a further member of the coordinate positioning machine, wherein the constraint member is adapted to constrain rotation of the predetermined part relative to the plane defined by the constraint member when the constraint member is attached to the elongate member and to the further member.

The constraint member may be adapted to constrain motion of the elongate member relative to a plane defined by the constraint member, when the constraint member is attached to the elongate member and to the further member.

The predetermined part may be of a type that is affected by the orientation of the elongate member relative to the plane defined by the constraint member. A surface of the elongate member to which the element is attached may be arranged to be parallel to the plane defined by the constraint member. If the constraint member is arranged in the coordinate positioning machine such that the plane defined by the constraint member is substantially vertical (or substantially aligned with the gravity), and if the surface of the elongate member to which the element is affixed is arranged to be parallel to that plane, then the constraint member will act to keep the encoder scale in a vertical plane.

Aside from the benefit described above of overcoming the technical issues described with reference to FIG. 3, the provision of a constraint according to an embodiment of the present invention can also be beneficial in other ways. For example, there may be an element attached to (or affixed to, or formed as part of, or defined by) the extendable leg assembly, where that element may have an effect on the orientation of the extendable leg assembly (or of an elongate member forming part of the extendable leg assembly) about the longitudinal axis and/or relative to the plane.

For example, the element may comprise a mechanical element, such as a drive element that is used for changing a separation between ends of the elongate member or a length associated with the extendable leg assembly. The drive element may be a motor for extending and retracting the extendable leg assembly.

Such a mechanical element may be relatively weighty, and if located off the longitudinal axis of the elongate member, which it typically would be, it will tend to cause rotation of the elongate member about its longitudinal axis. Such rotation can lead to problems, particularly where a joint is shared between adjacent leg assemblies such that the leg assemblies are situated in close proximity at the joint; in this situation, any rotation of the elongate member about its longitudinal axis may cause the adjacent leg assemblies to clash with one another, which in turn can cause the leg assembly to lift slightly off the joint. This is likely to lead to measurement errors, or could even cause the leg assembly to come off the joint completely.

Therefore, the use of a constraint member as an anti-rotation device in such a situation is beneficial since the constraint member will prevent such rotation about the longitudinal axis, or at least reduce such rotation to a sufficient extent that there is no longer a significant risk of the ends of adjacent leg assemblies clashing.

In such a situation, the constraint member may be arranged in the machine with the plane defined by the constraint member being substantially aligned with (e.g. parallel to or coincident with) a plane defined by the elongate member and an adjacent elongate member.

Rotation of the elongate member about a longitudinal axis of the elongate member can be considered to be a first rotational degree of freedom of the elongate member. This degree of freedom is constrained. The constraint member may also be adapted to constrain rotation of the elongate member out of the plane. This can be considered to be a second rotational degree of freedom of the elongate member. The constraint member may also be adapted to allow rotation of the elongate member within the plane. This can be considered to be a third rotational degree of freedom of the elongate member.

It can be considered that the constraint member is adapted to constrain rotation, relative to the plane defined by the constraint member, of a vector that is transverse (for example perpendicular) to a longitudinal axis of the elongate member.

The constraint member may be adapted to maintain a substantially constant angle between the plane defined by the constraint member and a vector that is transverse to the longitudinal axis of the elongate member. The vector is fixed relative to the elongate member (and so moves and rotates with the elongate member). Such a constraint effectively prevents (or at least reduces) rotation of the elongate member about the longitudinal axis of the elongate member (the first degree of freedom mentioned above).

The transverse vector may also be transverse to the plane defined by the constraint (as well as being transverse to the longitudinal axis of the elongate member). In such a case, the constraint also effectively amounts to preventing (or at least reducing) rotation of the elongate member in the second degree of freedom mentioned above.

However, such a constraint allows rotation of the elongate member in the third degree of freedom, since in doing so the angle between the plane and the transverse vector will remain constant.

The constraint member may be adapted to allow rotation of the plane about an attachment axis defined by an attachment feature which is used to attach the constraint member to the further member. The attachment axis may lie in or parallel to the plane defined by the constraint member. The attachment axis may be arranged in use to be aligned with or parallel to gravity.

It is to be noted that a first direction is considered to be transverse to a second direction if there is a non-zero angle between the first and second directions. A particular case is where the first direction is perpendicular to the second direction.

Furthermore, by 'constraining rotation' it is meant that such rotation is substantially prevented or at least reduced by the action of the constraint member.

The constraint member may be adapted to allow rotation of the plane about an attachment axis defined by an attachment feature which is used to attach the constraint member to the further member. The attachment axis may lie in or parallel to the plane. The attachment axis may be arranged in use to be aligned with or parallel to gravity.

The constraint member may be attached to the elongate member or it may be provided separate to the elongate member, for example in a kit of parts, ready for attachment to the elongate member.

Similarly, the constraint member may be attached to the further member or it may be provided separate to the further member, for example in a kit of parts, ready for attachment to the further member.

The constraint member may be adapted so as to be readily and easily attachable and detachable to and from one or both of the elongate member and the further member.

The elongate member may be supported within the machine in a manner that would, in the absence of the constraint member, allow rotation of the elongate member about its longitudinal axis.

The elongate member may be supported at one or both ends by a pivot joint, such as a ball joint.

The longitudinal axis of the elongate member would typically be considered to lie between the joints at either end of the elongate member.

For the pivot joint used in an embodiment of the present invention, a bearing arrangement may be provided at a first end of the elongate member, with the bearing arrangement providing three contact points, or substantially point-like contact surfaces, for bearing against an at least part spherical bearing surface provided on the machine, where a plane defined by the contact points or areas is substantially perpendicular to a longitudinal axis of the elongate member. The bearing arrangement thereby provides a kinematic or at least pseudo-kinematic coupling between the elongate member and the machine. The at least part spherical bearing surface may be provided by a ball, or part thereof, fixed in relation to the machine. Such a bearing arrangement may be provided at both ends of the elongate member. The three contact points or areas may be provided by three at least part spherical surfaces, such as three balls, each of which may be smaller than the at least part spherical surface (or ball) associated with the machine.

According to a further aspect of the present invention, there is provided an extendable leg assembly and associated constraint member suitable for use in a coordinate positioning machine according to the first aspect of the present invention.

According to a further aspect of the present invention, there is provided a constraint member for a non-Cartesian coordinate positioning machine having an extendable leg assembly for positioning a component within a working volume of the machine, wherein the constraint member is adapted to provide a predetermined part of the extendable leg assembly with substantially a same orientation relative to gravity for a same position of the component within the working volume.

According to a further aspect of the present invention, there is provided an extendable leg assembly for a non-Cartesian coordinate positioning machine, the extendable leg assembly comprising such a constraint member.

According to a further aspect of the present invention, there is provided a constraint member for constraining movement of an extendable leg assembly in a non-Cartesian coordinate positioning machine, wherein the constraint member is attachable to an elongate member of the extendable leg assembly and to a further member of the coordinate positioning machine, and wherein the constraint member defines a plane and is adapted to constrain rotation of the elongate member relative to that plane when the constraint member is attached to the elongate member and to the further member. All of the subsidiary features mentioned above in connection with the constraint member in the first aspect of the present invention apply to this aspect too.

According to a further aspect of the present invention, there is provided an extendable leg assembly for a non-Cartesian coordinate positioning machine, the extendable leg assembly comprising an elongate member and a constraint member attachable to the elongate member and to a further member of the coordinate positioning machine, wherein the constraint member is adapted to constrain rotation of the elongate member around a longitudinal axis of the elongate member when the constraint member is attached to the elongate member and to the further member. The constraint member may be adapted to constrain rotation of the elongate member relative to a plane defined by the constraint member when the constraint member is attached to the elongate member and to the further member. All of the subsidiary features mentioned above in connection with the first aspect of the present invention apply to this aspect too.

According to a further aspect of the present invention, there is provided an extendable leg assembly for a non-Cartesian coordinate positioning machine, the extendable leg assembly comprising an elongate member and a constraint member attachable to the elongate member and to a further member of the coordinate positioning machine, wherein the constraint member is adapted to constrain rotation of the elongate member relative to an axis and/or a plane defined by the constraint member when the constraint member is attached to the elongate member and to the further member. All of the subsidiary features mentioned above in connection with the first aspect of the present invention apply to this aspect too.

According to a further aspect of the present invention, there is provided an extendable leg assembly for a non-Cartesian coordinate positioning machine, the extendable leg assembly comprising an elongate member having a bearing arrangement provided at a first end thereof, with the bearing arrangement providing three contact points, or substantially point-like contact surfaces, for bearing against an at least part spherical bearing surface provided on the machine, where a plane defined by the contact points or areas is substantially perpendicular to a longitudinal axis of the elongate member. Preferable features of the bearing arrangement are mentioned above in relation to first aspect of the present invention.

According to a further aspect of the present invention, there is provided a non-Cartesian coordinate positioning machine comprising an extendable leg assembly for positioning a component within a working volume of the machine, and a constraint member associated with the extendable leg assembly for providing a predetermined part of the extendable leg assembly with substantially a same orientation relative to gravity for a same position of the extendible leg assembly within the machine.

According to a further aspect of the present invention, there is provided a non-Cartesian coordinate positioning machine comprising an extendable leg assembly for positioning a moveable component within a working volume of the machine, and a constraint member associated with the extendable leg assembly for providing a predetermined part of the extendable leg assembly with substantially a same orientation relative to gravity for a same relative positioning of ends of the extendible leg assembly.

According to a further aspect of the present invention, there is provided an extendable leg assembly for a non-Cartesian coordinate positioning machine, the extendable leg assembly comprising an elongate member and a constraint member, wherein the constraint member is adapted to constrain rotation of the elongate member relative to a plane defined by the constraint member when the extendable leg assembly is arranged in the machine.

According to a further aspect of the present invention, there is provided an extendable leg assembly for a non-Cartesian coordinate positioning machine, the extendable leg assembly comprising an elongate member and a constraint member for maintaining a predetermined part or surface of the elongate member substantially aligned in use with gravity.

Reference will now be made, by way of example, to the accompanying drawings, in which:

FIG. 1, discussed hereinbefore, is schematic illustration of a hexapod non-Cartesian coordinate positioning machine, having six extendable legs;

Figure 13:
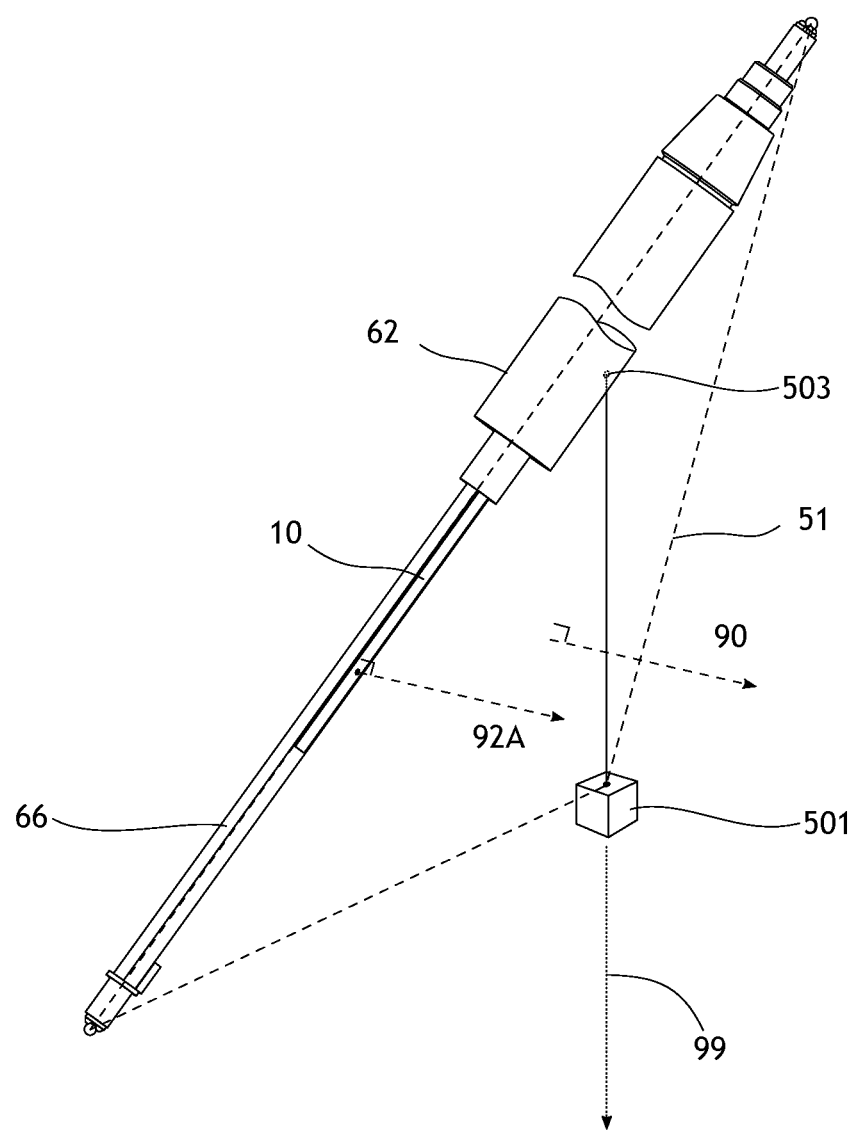
Figure 14:
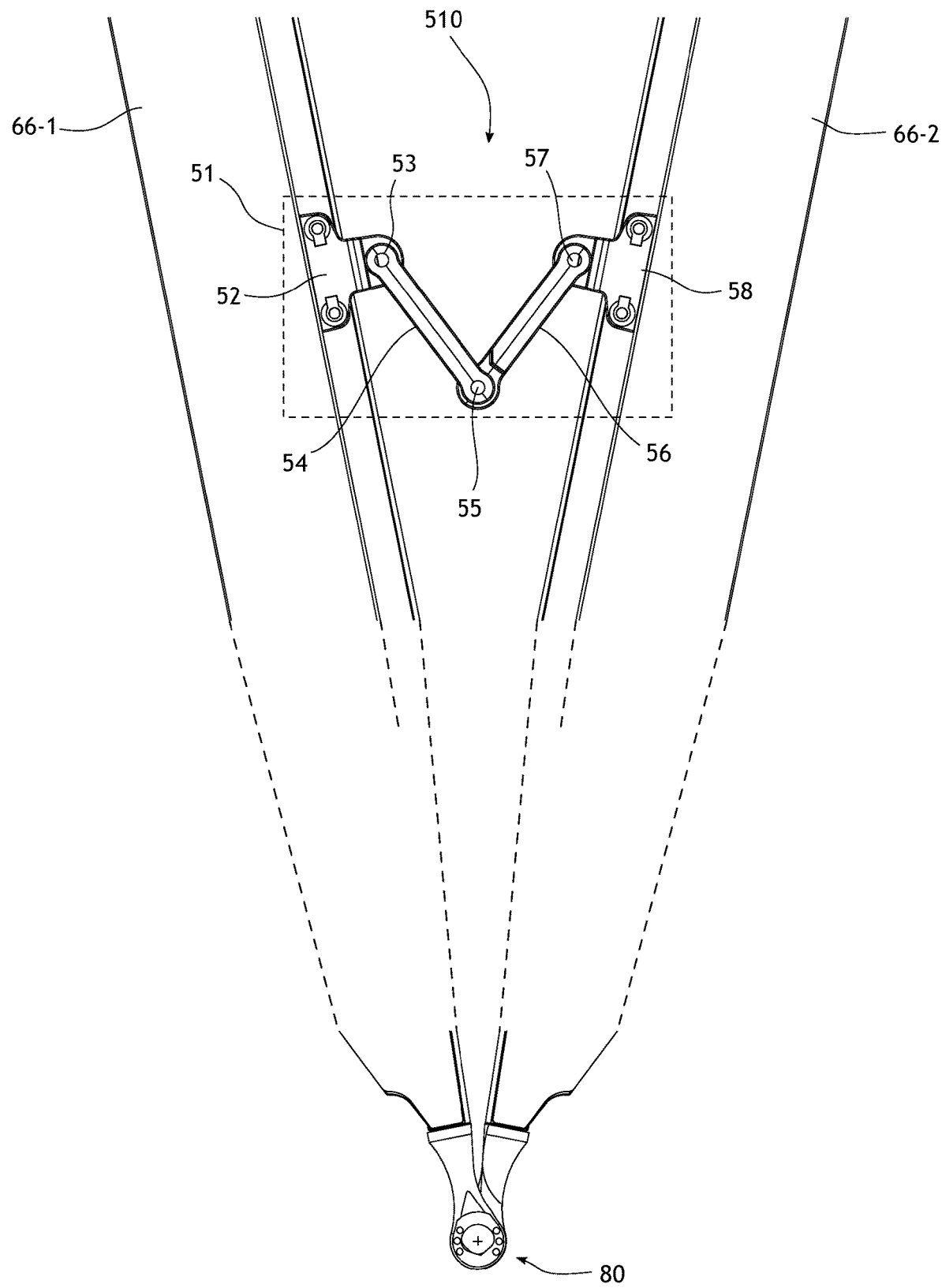
Figure 15:
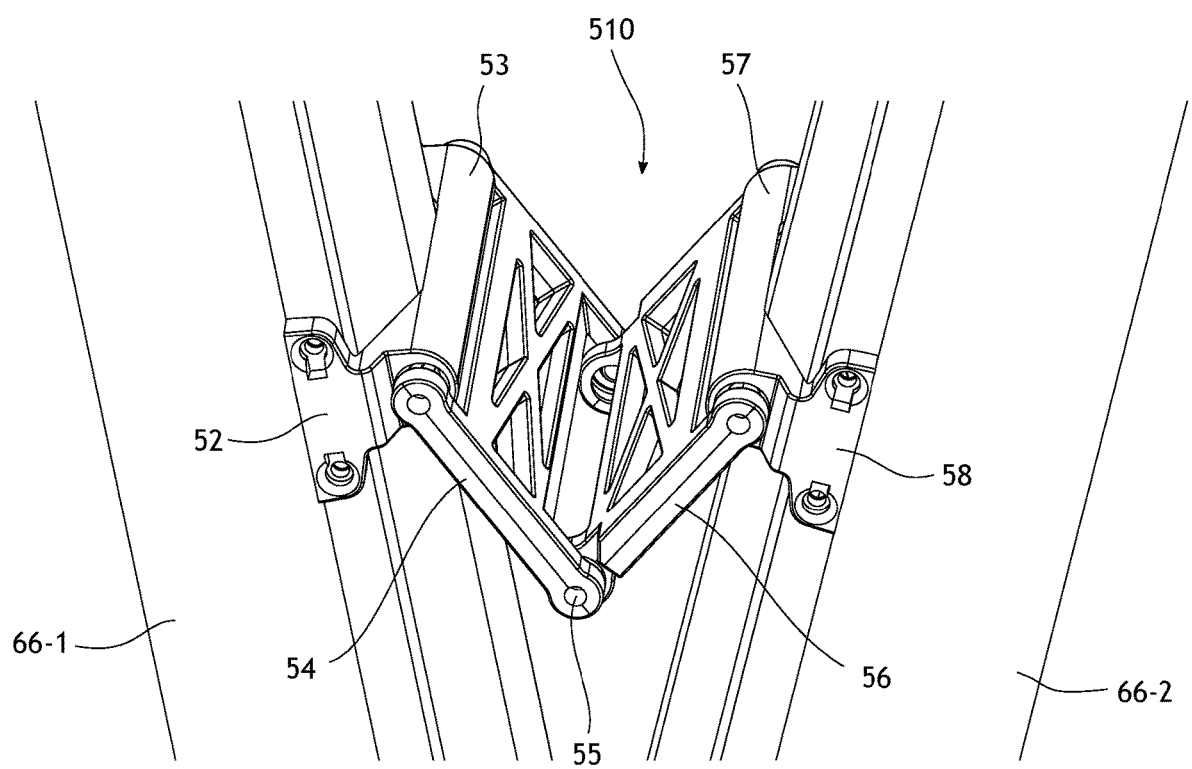
Figure 16A:
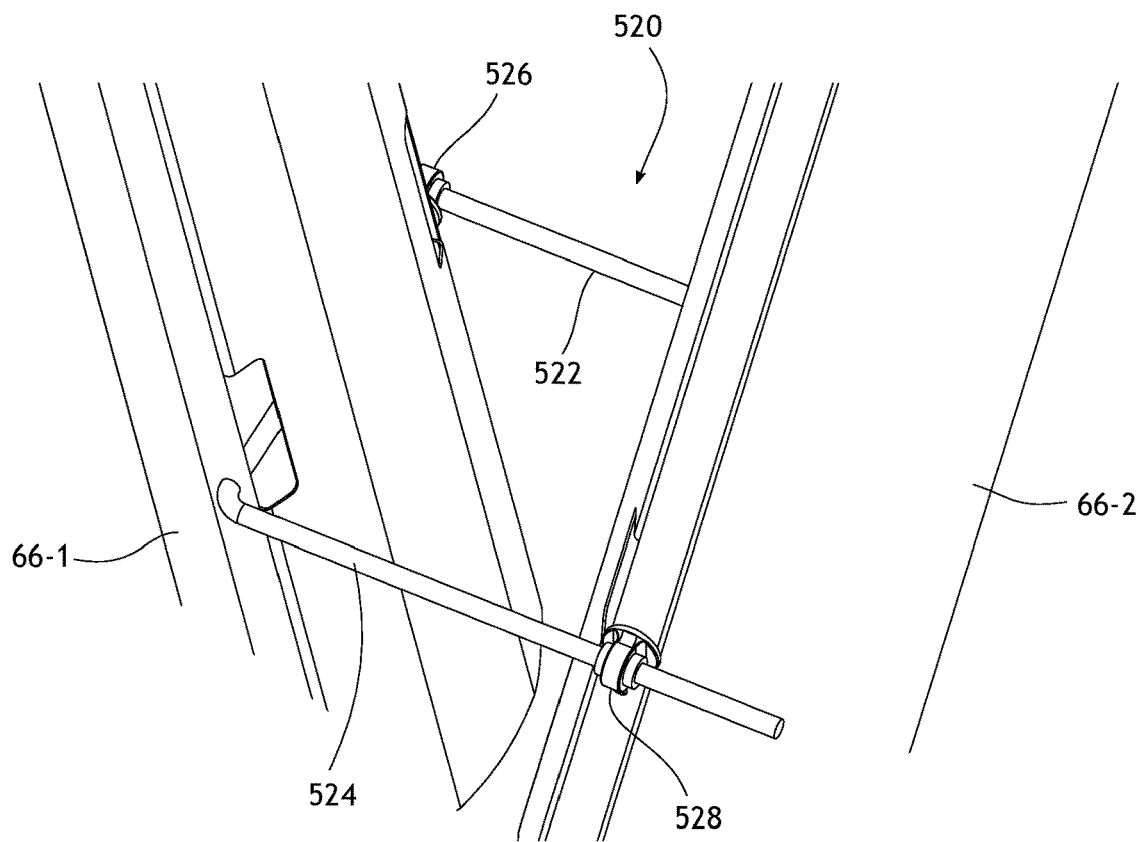
Figure 16B:
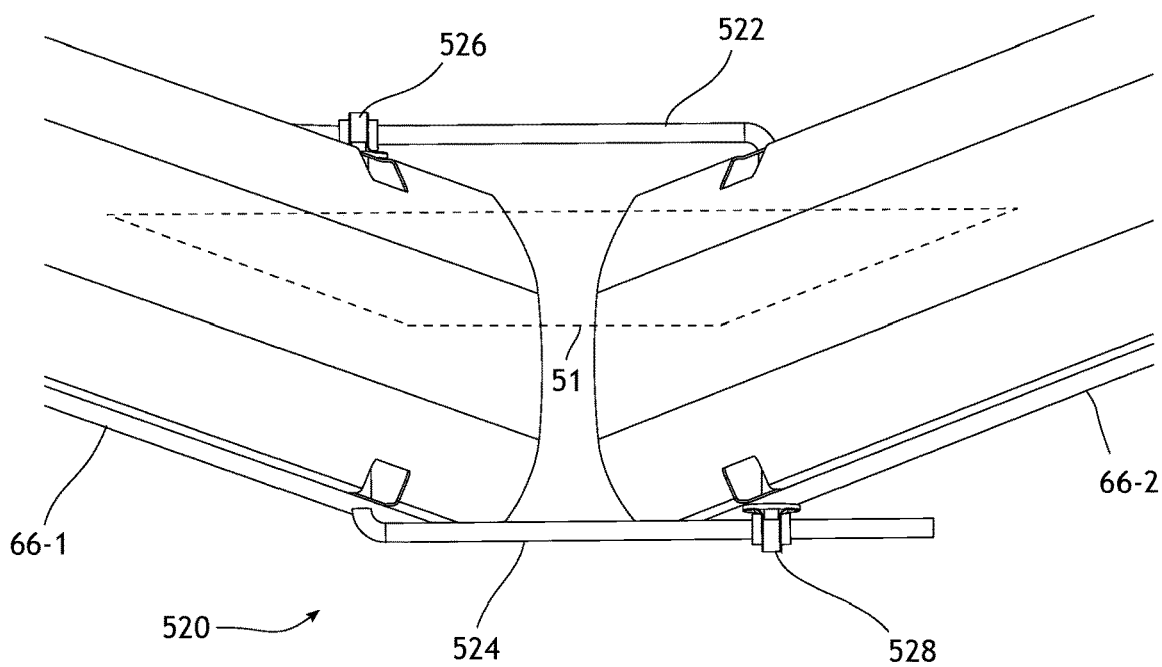
Figure 17A:
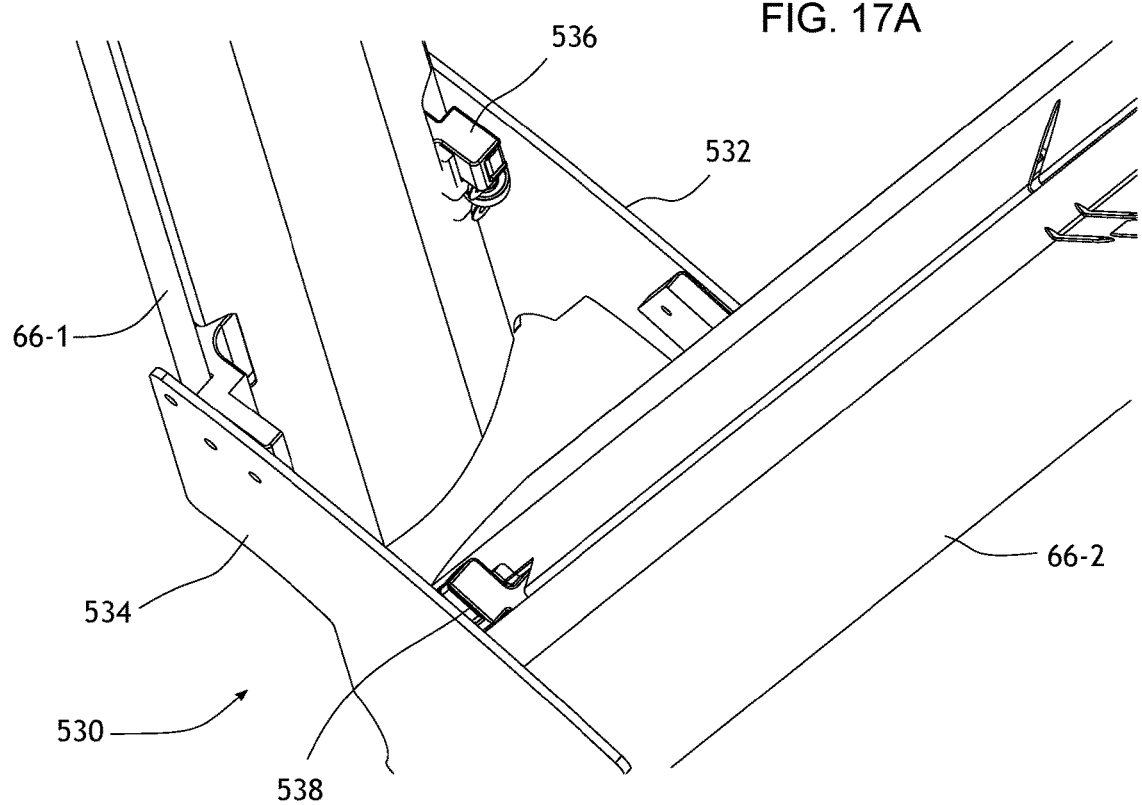
Figure 17B:
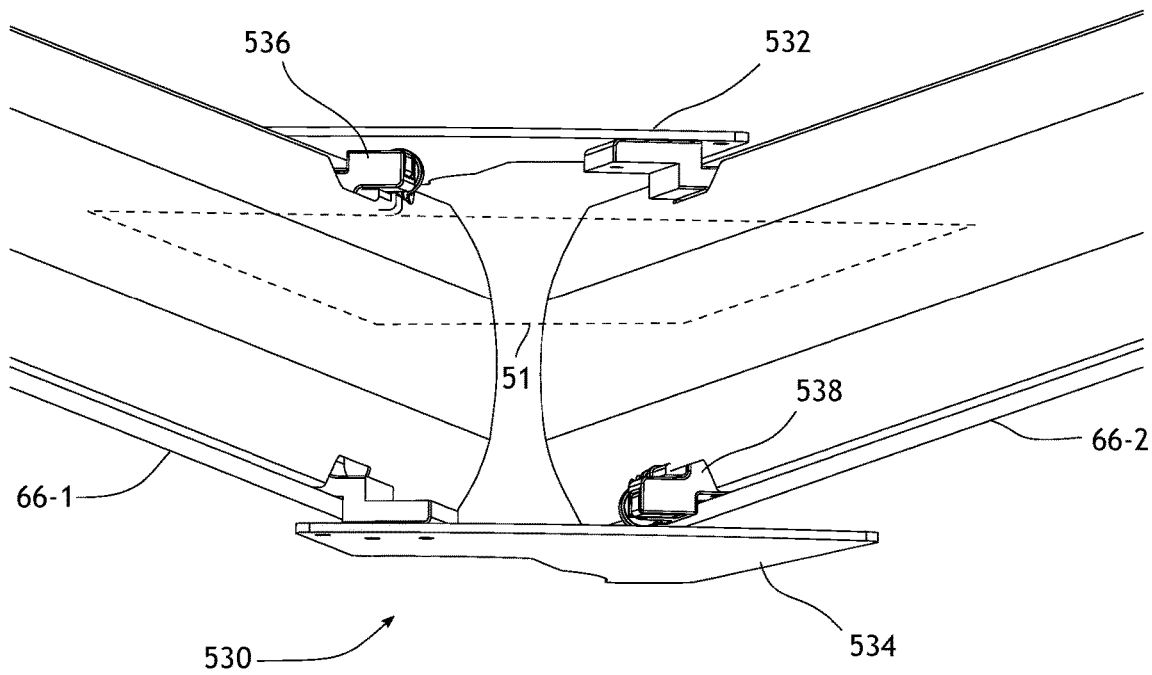

FIG. 13 illustrated another type of constraint suitable for use in an embodiment of the present invention;

FIG. 14 illustrates the use of a constraint member in another embodiment of the present invention, in which the constraint member is provided between two extendable legs of a non-Cartesian coordinate positioning machine;

FIG. 15 is a close-up view of the constraint member of FIG. 14;

FIGS. 16A and 16B illustrate an alternative to the constraint member of FIG. 14, with FIG. 16A showing an angled view and FIG. 16B showing a top view; and FIGS. 17A and 17B illustrate an alternative to the constraint member of FIG. 14, with FIG. 17A showing an angled view and FIG. 17B showing a top view.

Figure 4:
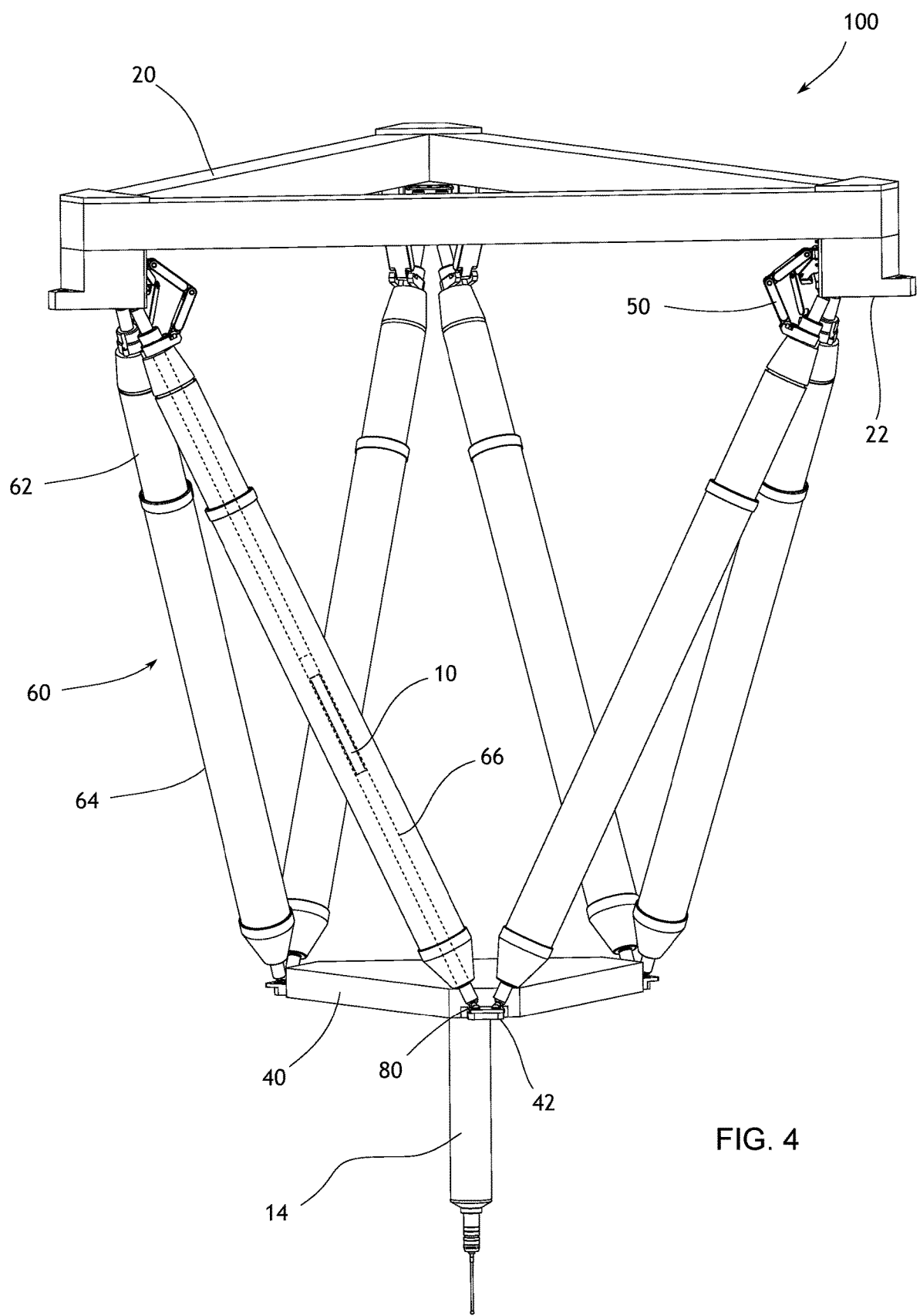
FIG. 4 is an overall view of a non-Cartesian coordinate positioning machine comprising extendable leg assemblies according to an embodiment of the present invention.

FIG. 4 provides an overall view of a non-Cartesian coordinate positioning machine 100 embodying the present invention. The non-Cartesian coordinate positioning machine 100 is similar in principle to that described above with reference to FIG. 1. However, a key difference is the use of constraint members 50 in the non-Cartesian coordinate positioning machine 100 to address the above-mentioned technical problems associated with known non-Cartesian coordinate positioning machines.

The non-Cartesian coordinate positioning machine 100 illustrated in FIG. 4 comprises six extendable leg assemblies 60, generally of the same construction, arranged between an upper platform 20 and a lower platform 40. Each of the six extendable leg assemblies 60 comprises an upper tube 62 and a lower tube 64, with the upper tube 62 sliding telescopically within the lower tube 64.

With the particular example illustrated in FIG. 4, the upper platform 20 is fixed and the lower platform 40 is moveable relative to the upper platform by operation of the six extendable leg assemblies 60, with a probe 14 being mounted to a lower surface of the lower platform 40. In this configuration, a workpiece (not illustrated) would be mounted to a part of the fixed structure of the machine 100 below the lower platform 40, so that the working volume of the machine 100 is below the lower platform 40 rather than between the upper and lower platforms 20, 40. A weight of the lower (moving) platform 40 would typically be supported at least partially by a counterbalance arrangement (not shown).

Figure 1:
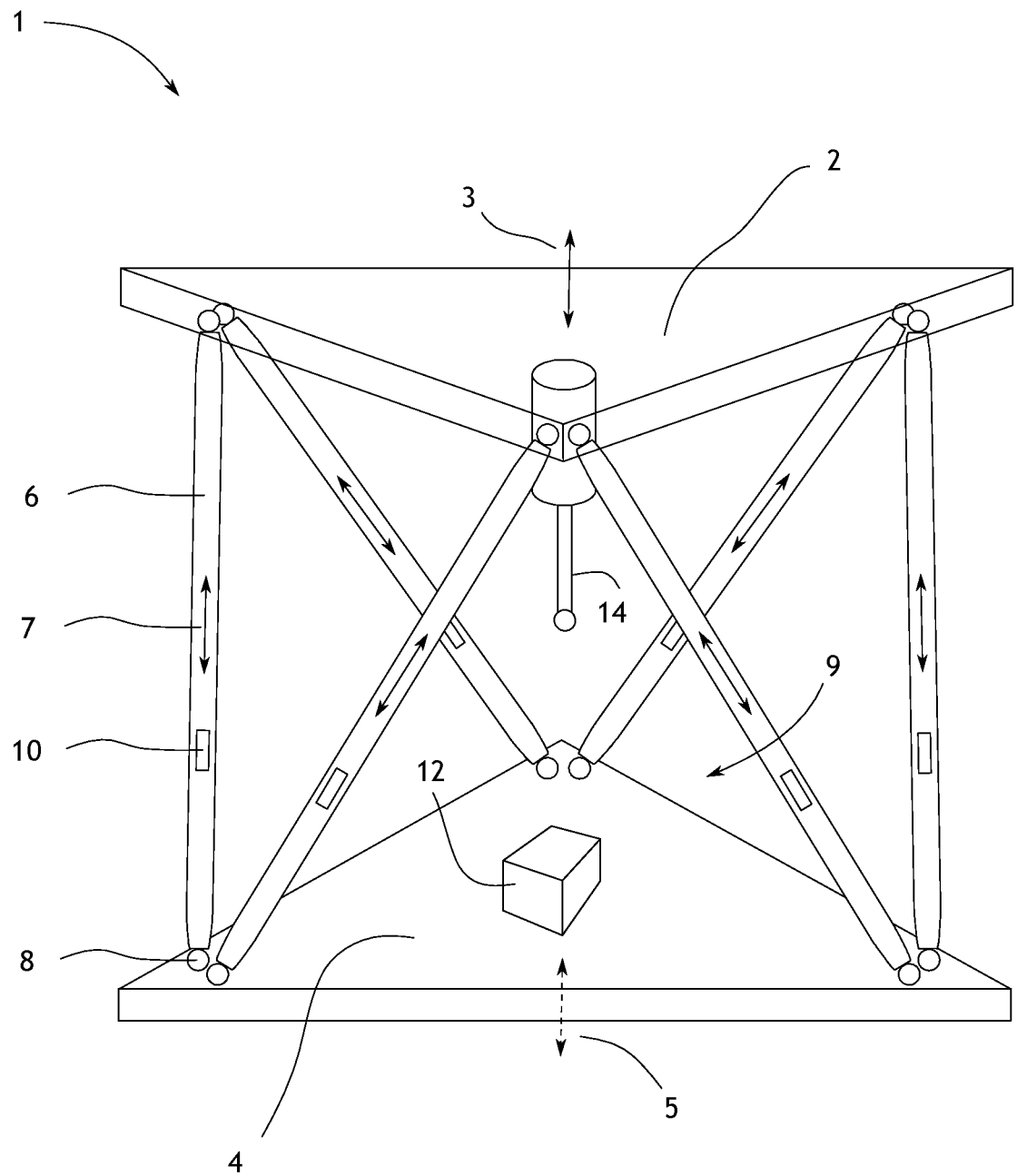
Figure 2A:
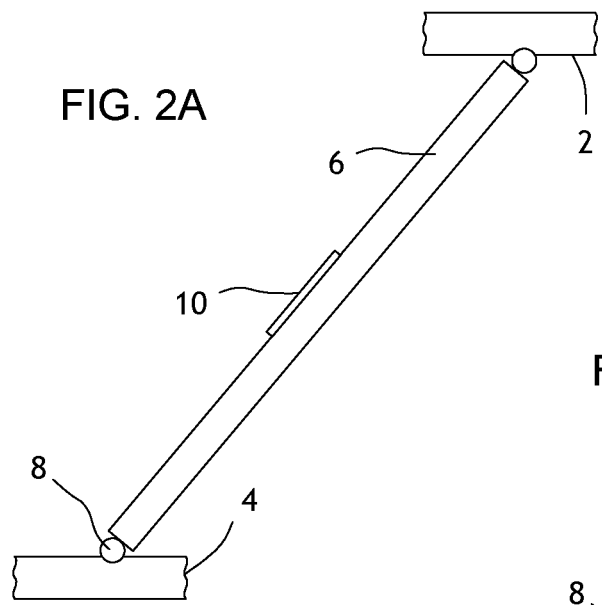
FIGS. 2A and 2B illustrate a problem associated with having an encoder scale affixed to an upper surface of an extendable leg of the non-Cartesian coordinate positioning machine of FIG. 1.
Figure 2B:
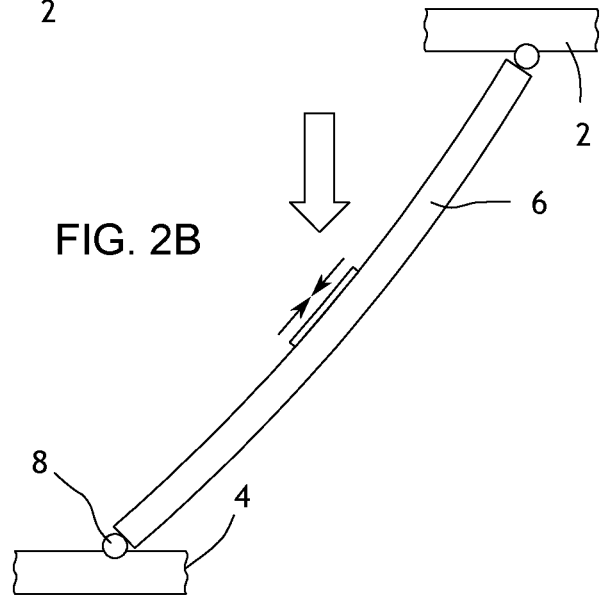

As with the machine of FIG. 1, the extendable leg assemblies 60 are for positioning a component (in the example illustrated in FIG. 4, the component is the probe 14, or at least part a specific part of the probe 14 such as the tip of the probe 14) within the working volume of the machine. Constraint members 50 associated respectively with the extendable leg assemblies 60 are for providing a predetermined part of the extendable leg assembly (in this example, an encoder scale, to be described further below) with substantially a same orientation relative to gravity for a same position of the component within the working volume.

Upper and lowers ends of each extendable leg assembly 60 are connected respectively to the upper platform 20 and lower platform 40 via individual ball joints 80. The lower ball joints 80 for the front-most two of the extendable leg assemblies 60 are just visible in FIG. 4, and shown in more detail in FIG. 5.

Figure 6:
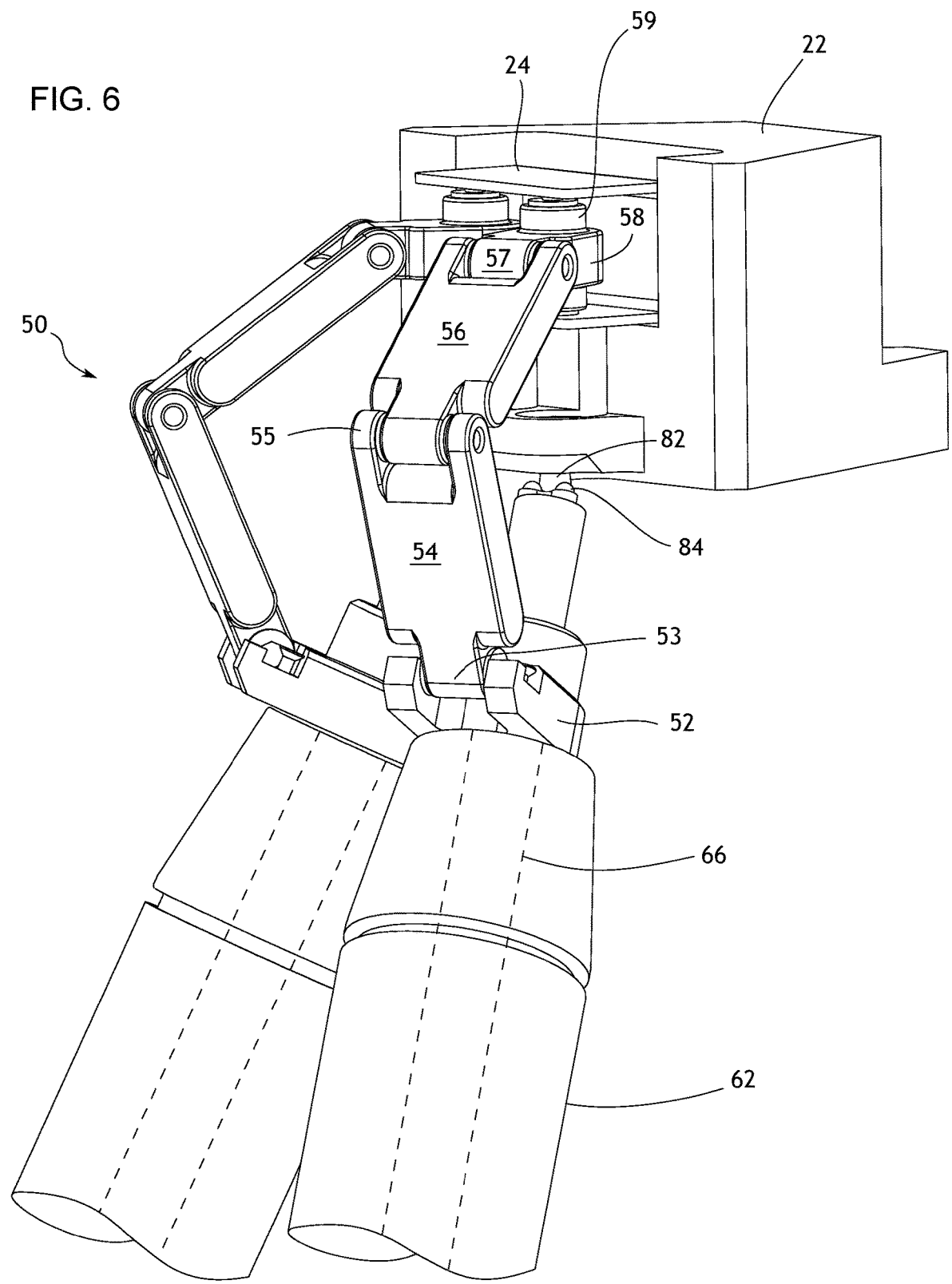
FIG. 6 is a close-up view of part of the machine of FIG. 4, showing the connection between the extendable leg assemblies and the upper platform of the machine, and in particular showing constraint members associated with two of the extendable leg assemblies.

The lower ball joints 80 are supported by support blocks 42 of the lower platform 40, while the upper platform 20 is supported on the upper ball joints 80 via support blocks 22 of the upper platform 20; the connection between the upper platform 20 and the extendable leg assemblies 60 is illustrated in more detail in FIG. 6.

The upper and lower tubes 62, 64 of each extendable leg assembly 60 enclose an elongate member 66, shown in dotted outline in one of the extendable leg assemblies of FIG. 4, with an encoder scale 10 affixed to the elongate member 66. The elongate member 66 is itself extendable, for example by way of a telescopic arrangement. Each elongate member 66 extends from its upper joint 80 to its lower joint 80, and it is the respective lengths of the elongate members 66 that determine the precise positioning and orientation of the lower platform 40 (and therefore the probe 14). It is therefore the length of the elongate members 66 that must be measured precisely during a measuring or scanning operation on a workpiece in order to determine the precise location of the tip of the stylus when it is contact with the workpiece surface. Operation of an extendible elongate member 66 is described in more detail below with reference to FIG. 12.

At the upper end, each extendable leg assembly 60 is provided (or associated) with a constraint member 50, which is attached to the elongate member 66 of the extendable leg assembly 60 and to a further member (the support block 22) provided on the upper platform 20. The constraint member 50 effectively 'ties' the elongate member 66 to the upper platform 20 in order to prevent (or at least reduce) undesired rotation of the elongate member 66 about its longitudinal axis. The construction and operation of the constraint member 50 will be described in more detail below with reference to FIGS. 6 to 11.

Figure 5:
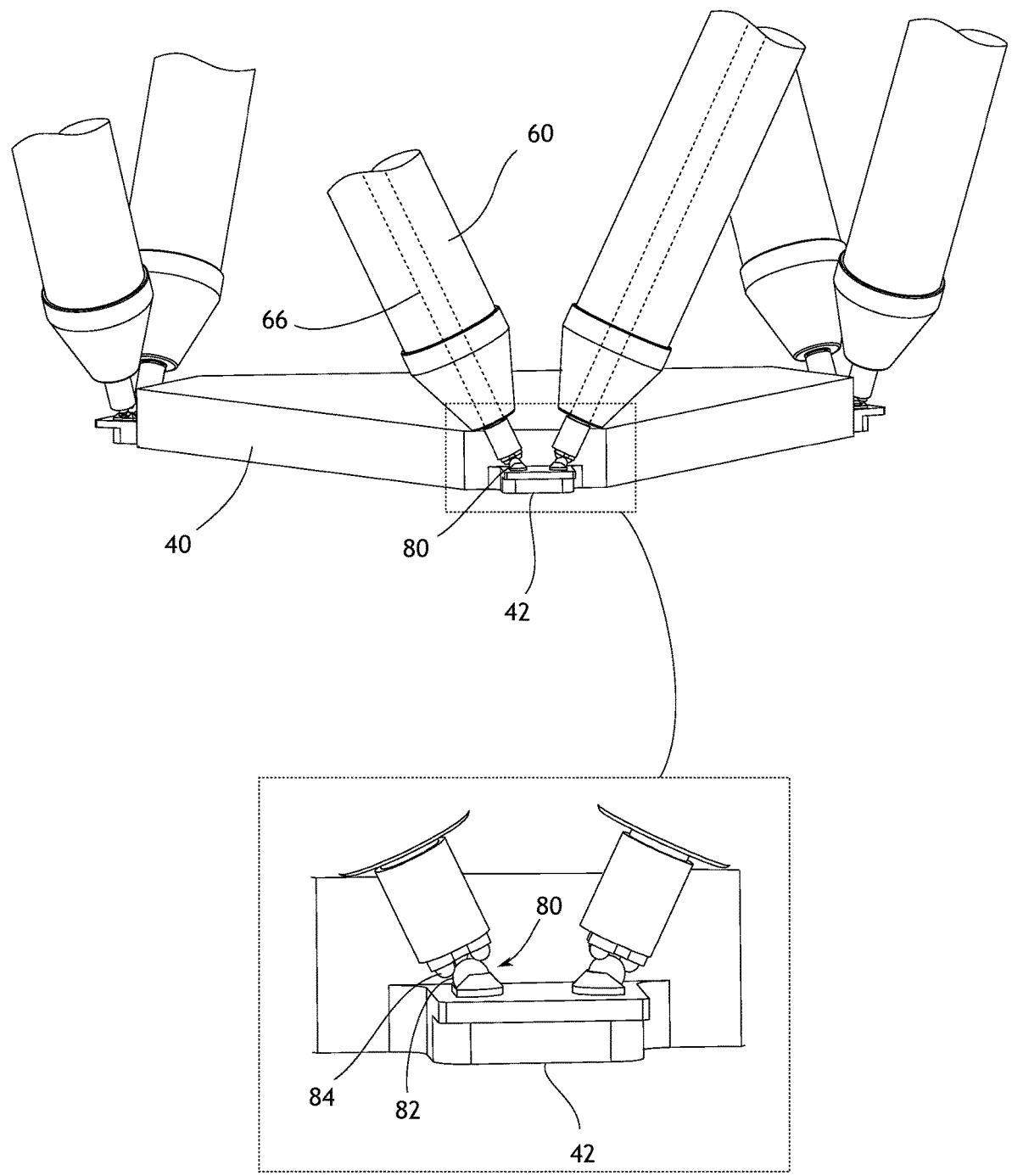
FIG. 5 is a close-up view of part of the machine of FIG. 4, showing in more detail the connection between the extendable leg assemblies and the lower platform of the machine.

FIG. 5 is a close-up view showing the connection between the extendable leg assemblies 60 and the lower platform 40 in more detail. As is shown particularly in the zoomed view to the bottom of FIG. 5, three balls 84 are provided in a triangular arrangement at the lower end of the elongate member 66, with the plane of the triangular arrangement being substantially perpendicular to the longitudinal axis of the elongate member 66. The support block 42 is provided with a larger, fixed, ball 82 which acts to support the three balls 84 on the end of the elongate member 66, with the larger ball 82 nestling within the smaller balls 84.

The use of three balls 84 means that coupling is kinematic in nature, or at least pseudo-kinematic, with three points of contact (or at least three small contact areas that approximate three points of contact). The weight of the elements above the three balls 84 will naturally force the elongate member 66 into a repeatable position relative to the ball 82, with no over constraint, and thereby form a joint that is particularly suitable for a metrology instrument where repeatability is important. It is not essential to use balls 84, and instead a bearing arrangement can be used that provides three points of contact (or small contact areas) which effectively form a kinematic cup or cone. It will also be appreciated that, where balls are used, they need not be complete balls but need only be at least part spherical in the areas that are to be used as bearing surfaces.

The ball joint arrangement shown in FIG. 5 has certain advantages over other known ball joint arrangements. In other arrangements, a single ball is provided at the end of the elongate member, and is supported by a fixed cone or cup arrangement. Alternatively, a ring having three point contacts engages with a fixed ball, but from the side. An advantage of an arrangement as shown in the present application is that the elongate member 66 is securely held on the ball 82 at a wider range of angles, providing a wide range of angular motion for the elongate member 66 around the ball 82. With other known ball joint arrangements, the motion can be more restricted and/or less secure, with the elongate member potentially being more prone to disengagement from the joint.

The pivot joint arrangement of FIG. 5 relates to an aspect of the present invention that is independent of the aspect which relates to the use of constraint members 50, and it is to be emphasised that use of a different type of joint is perfectly feasible in conjunction with the constraint members 50.

Figure 7:
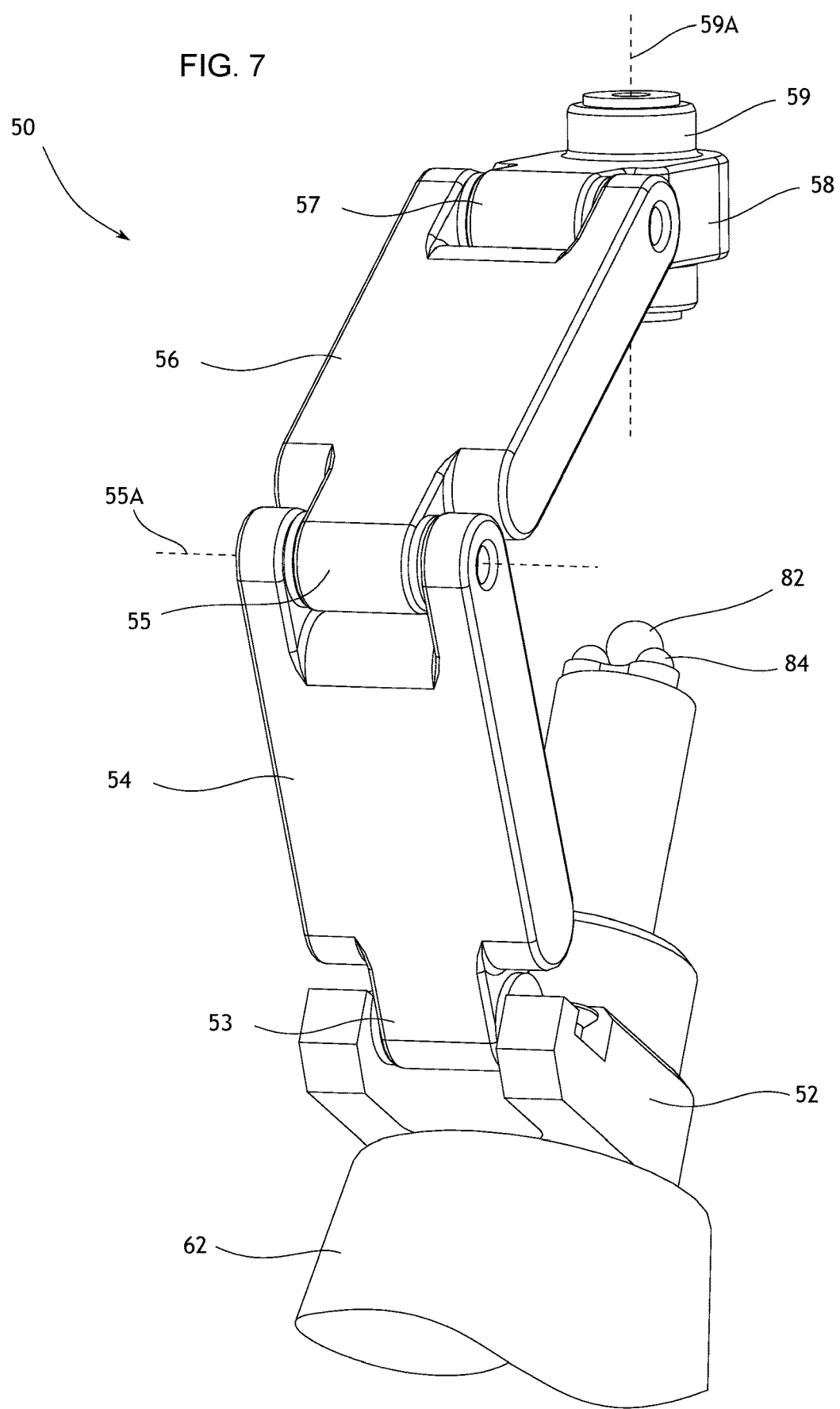
FIG. 7 shows in more detail a constraint member according to an embodiment of the present invention.
Figure 8:
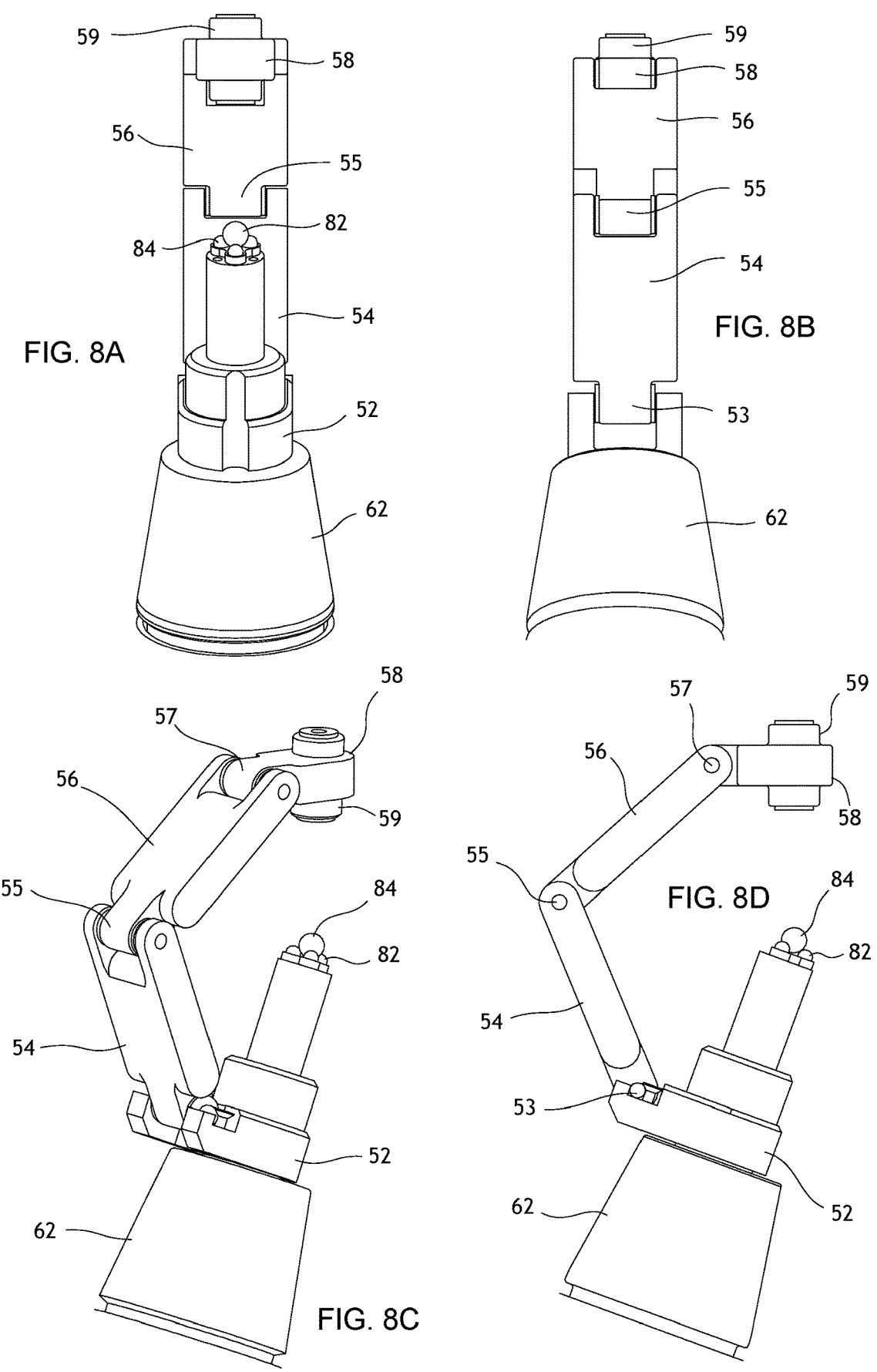
FIGS. 8A to 8D show a constraint member according to an embodiment of the present invention from various different angles.
Figure 9:
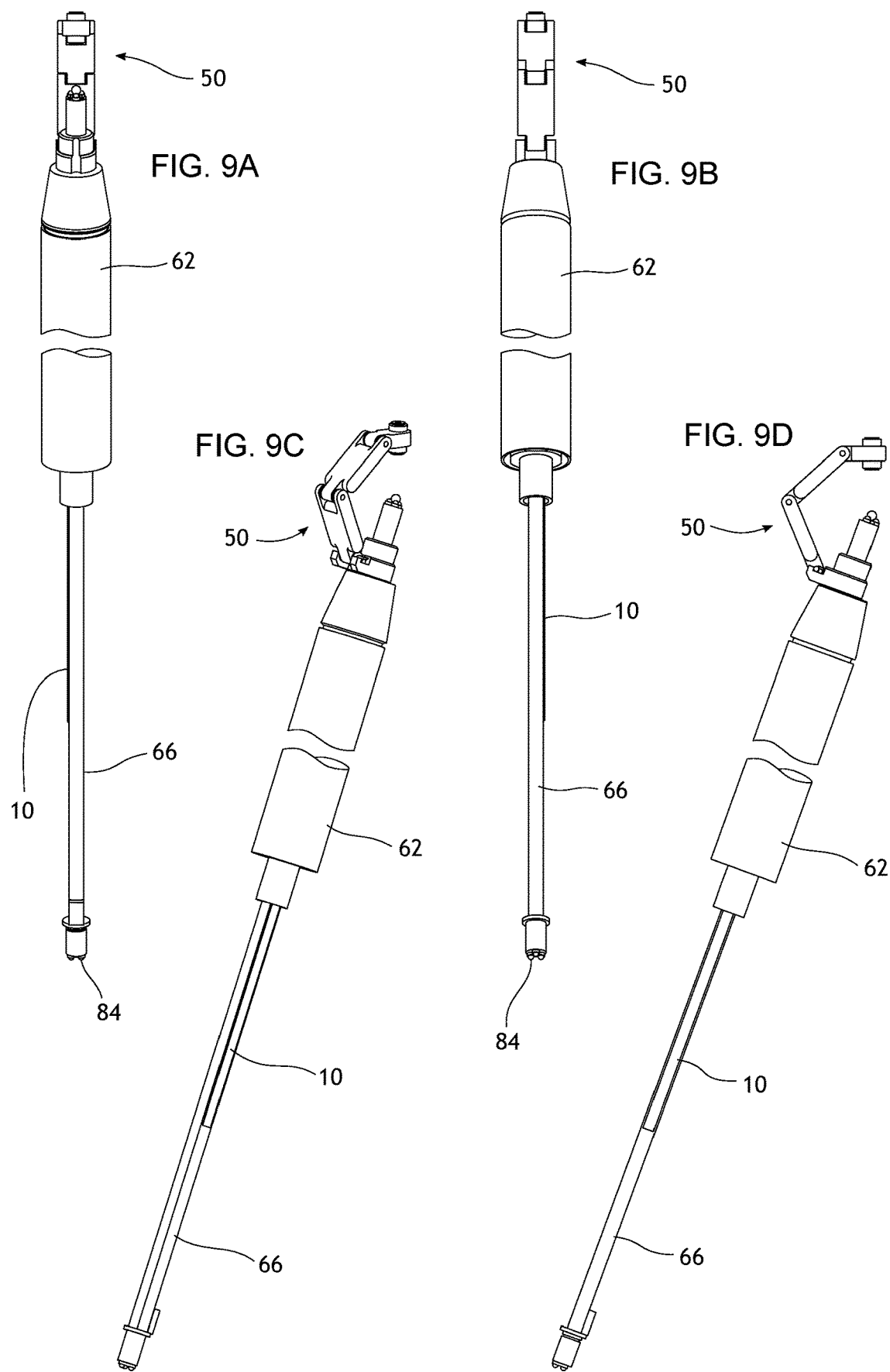
FIGS. 9A to 9D show an extendable leg assembly according to an embodiment of the present invention from various different angles, and in particular illustrating the relative positions of and the relationship between the constraint member and the encoder scale affixed to an elongate member of the extendable leg assembly.

The constraint member 50 will now be described in more detail with reference to FIGS. 6 to 8. FIG. 6 is a close-up view showing in more detail the connection between the extendable leg assemblies 60 and the upper platform 20 of the machine 100, and in particular showing in more detail the constraint members 50 associated with two of the extendable leg assemblies 60 of FIG. 4. FIG. 7 shows one of the constraint members 50 when detached from the support block 22, while FIGS. 8A to 8D show a constraint member 50 from various angles (again, detached from the support block 22). In particular, FIG. 8A shows a front view of the constraint member 50, with the ball joint 82, 84 in view, FIG. 8B shows a rear view, FIG. 8C shows a perspective view, and FIG. 8D shows a side view.

The constraint member 50 can generally be described as a multi-part or multi-section hinge. The illustrated example comprises four parts or sections 52, 54, 56 and 58 connected by rotary joints or knuckles 53, 55 and 57 having substantially parallel axes of rotation. The joints 53, 55 and 57 may be of a standard pin and bearing construction, and may use ball bearings in order to reduce the effect of friction.

With the four parts 52, 54, 56 and 58 connected by joints 53, 55 and 57 having substantially parallel rotation axes as illustrated, movement of the parts 52, 54, 56 and 58 relative to one is restricted to a movement in a plane, with the plane being perpendicular to the rotation axes of the joints 53, 55 and 57. In this way the constraint member 50 defines a plane, which will be described in more detail below with reference to FIGS. 10 and 11.

The upper-most part 58 is connected to the support block 22 via a rotary joint 59 having a rotation axis 59A (see FIG. 7) that is oriented substantially perpendicular to the rotation axes of the rotary joints 53, 55, 57 (for example the rotation axis of joint 55 is marked as 55A in FIG. 7). This allows for rotation of the constraint member 50 about the axis 59A of joint 59 when the constraint member 50 is connected to the upper platform 20, and thereby allows rotation about the axis 59A of the plane defined by the constraint member 50.

FIGS. 9A to 9D show the same four views of the constraint member 50 as are illustrated in FIGS. 8A to 8D respectively, but in FIGS. 9A to 9D the view is widened to include the elongate member 66 down to the opposite end. FIGS. 9A to 9D also illustrate the extendable leg assembly 60 "opened up" in part to show the elongate member 66, and in particular the positioning of a predetermined part of the extendable leg assembly 60 whose orientation is to be controlled or constrained relative to gravity. The predetermined part is an encoder scale 10, which is used for measuring the length of the elongate member 66 in conjunction with a scale reader or readhead (not shown), relative to the constraint member 50. The scale 10 and scale reader are described in more detail below with reference to FIG. 12.

Figure 10:
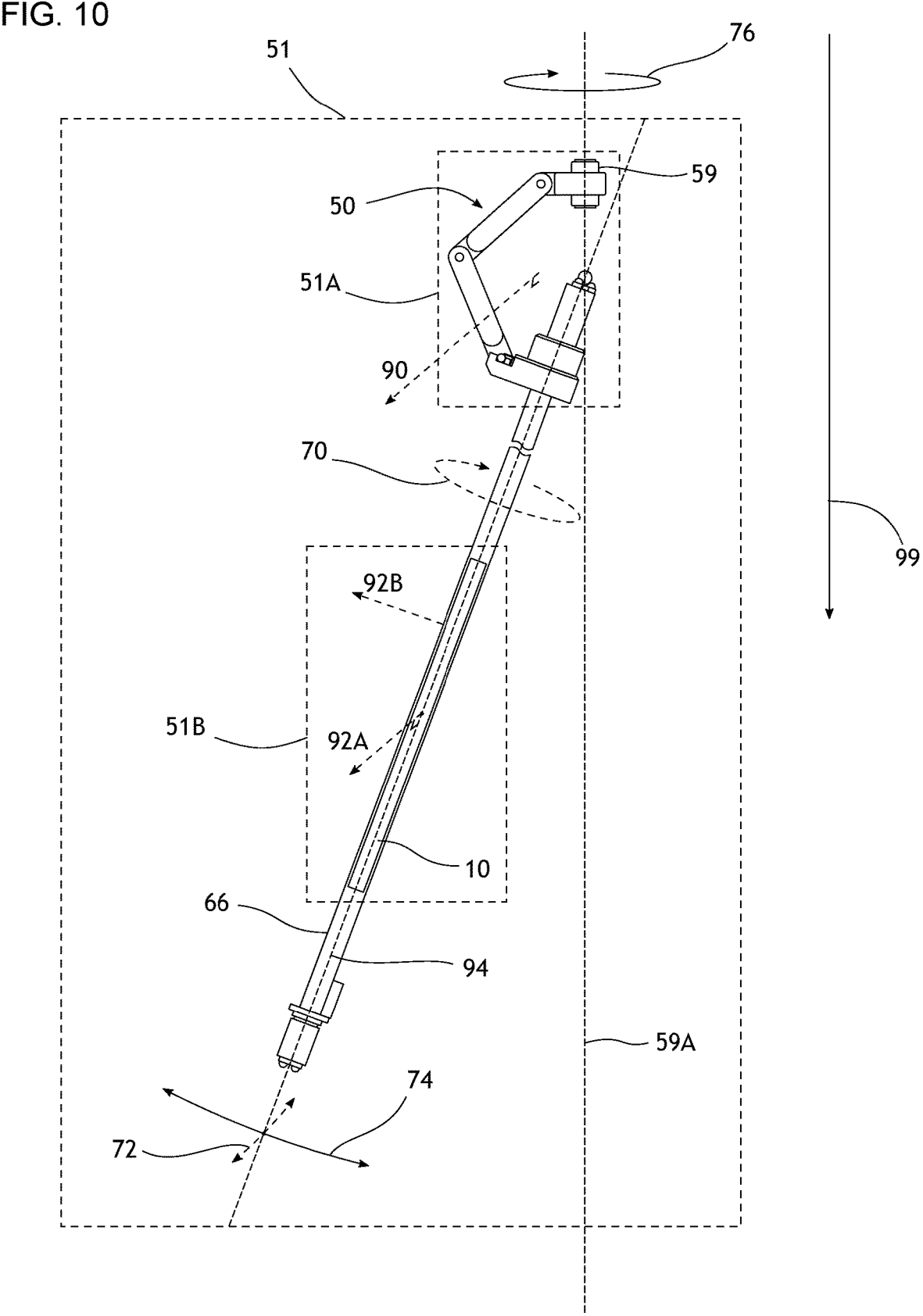
FIG. 10 illustrates in more detail the relative positions of and the relationship between the constraint member and the encoder scale affixed to the elongate member of the extendable leg assembly, and the manner in which motion of the elongate member is constrained by the constraint member.
Figure 11:
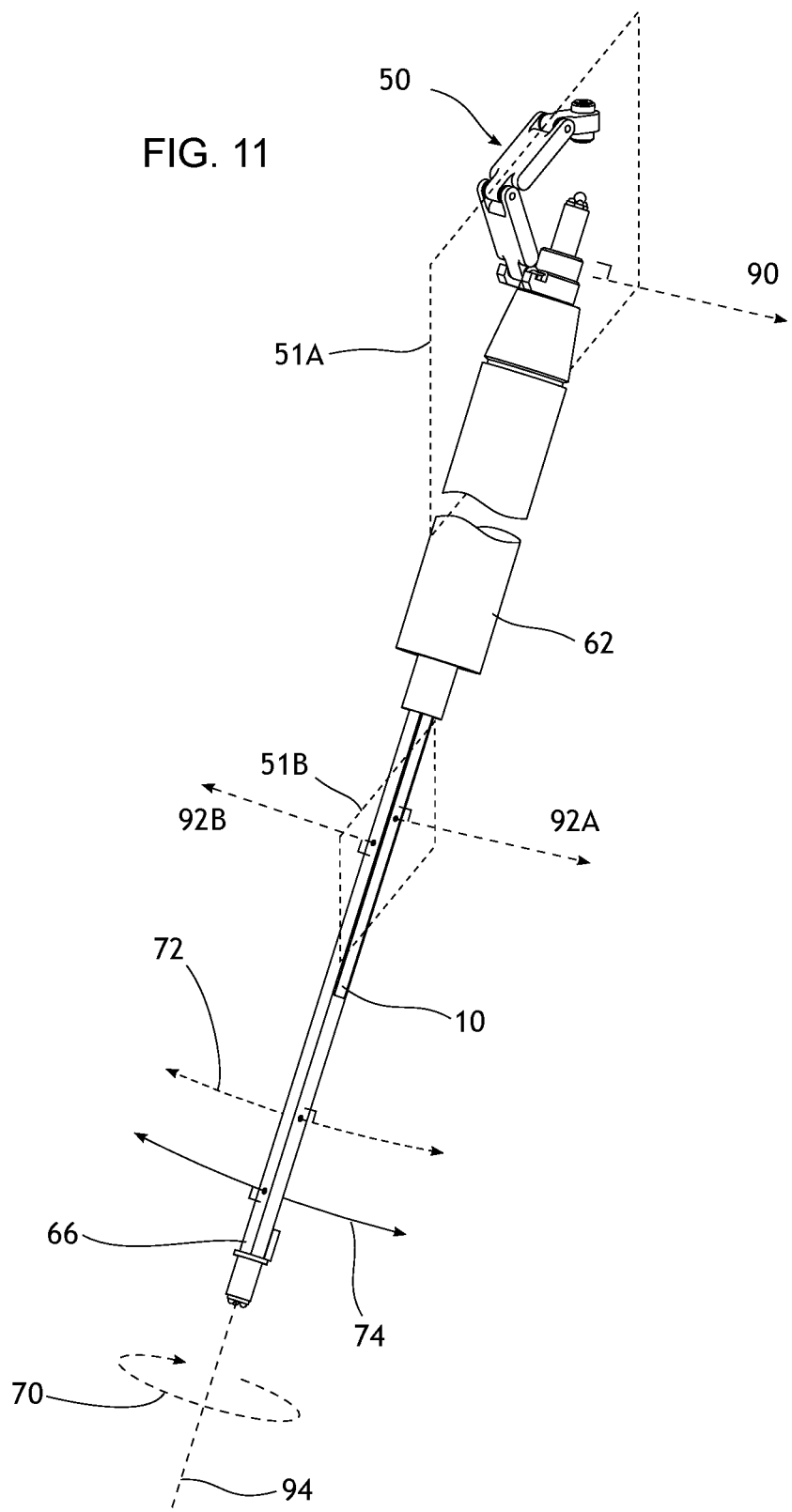
FIG. 11 is similar to FIG. 10 but viewed from a different angle.

FIGS. 10 and 11 illustrate the relative positioning of the encoder scale 10 and constraint member 50 in more detail. FIG. 10 is a side view corresponding to that of FIG. 9D, while FIG. 11 is a perspective view corresponding to that of FIG. 9C. As mentioned above, the constraint member 50 defines a plane 51, as illustrated in FIG. 10, with parts of that plane 51 (or planes parallel to plane 51) being marked at 51A (in the vicinity of the constraint member 50) and 51B (in the vicinity of the encoder scale 50).

In this embodiment, the elongate member 66 is generally square in cross section, and is arranged relative to the constraint member 50 such that two of its four sides are substantially parallel with the plane 51 and the other two sides are substantially perpendicular to the plane 51. The encoder scale 10 is affixed to a surface that is parallel to the plane 51. Therefore, in the front view of the constraint member 50 as shown in FIG. 9A, the encoder scale 10 is affixed to a side surface of the elongate member 66, while in the side view as shown in FIG. 9D and FIG. 10 the encoder scale 10 is affixed to a front surface of the elongate member 66. Furthermore, the plane 51 is arranged such that it is parallel to the direction 99 of gravity (i.e. so that the direction 99 lies in the plane 51). The rotation axis 59A of the rotary joint 59 is also arranged parallel to the direction 99 of gravity. The encoder scale 10 is spaced away from the longitudinal axis 94 of the elongate member 66 in a direction 90, 92A perpendicular to the plane 51, 51B defined by the constraint member 50.

In operation of this embodiment of the present invention, the constraint member 50 is adapted to constrain motion of the elongate member 66 relative to the plane 51 defined by the constraint member 50 when the constraint member 50 is attached to the elongate member 66 and to a further member of the coordinate positioning machine 100 (in this embodiment the further member is in the form of the support block 22). In doing so, the constraint member 50 is able to prevent rotation of the encoder scale 10 away from a desired orientation, parallel with gravity, whilst still allowing changes in the angle between the elongate member 66 and the upper and lower platforms 20, 40 which are required to allow the lower platform 40 to move relative to the upper platform 20.

The constraint member 50 operates by maintaining a substantially constant angle between the plane 51 defined by the constraint member 50 and a vector 92A, 92B that is transverse to a longitudinal axis 94 of the elongate member 66 (and which moves with the elongate member 66). For example, vector 92A is perpendicular to the longitudinal axis 94 and is also perpendicular to the surface of the elongate member 66 on which the encoder scale 10 is attached. Since the attachment surface for the encoder scale 10 is parallel with plane 51B, the vector 92A is also perpendicular to the plane 51B defined by the constraint 50. This is illustrated in both FIG. 10 and FIG. 11.

Now consider all possible movements of the elongate member 66 that are permitted by the constraint member 50, and the effect these have on the angle between the plane 51 defined by the constraint member 50 and the vector 92A. The constraint member 50 prevents rotation about a first rotational degree of freedom 70, which is rotation about the longitudinal axis 94. The constraint member 50 also prevents rotation about a second rotational degree of freedom 72, which is rotation of the elongate member 66 out of the plane 51. On the other hand, the constraint member 50 allows rotation about a third rotational degree of freedom 74, which is rotation of the elongate member 66 within the plane 51.

By constraining movement to the third rotational degree of freedom 74, within or parallel to the plane 51 defined by the constraint member 50, the angle between the plane 51 and the vector 92A is maintained substantially constant. Any change in that angle would lead to the encoder scale 50 rotating out of the plane 51B, and would subject the encoder scale to undesirable types of distortion described above with reference to FIG. 3.

A similar analysis can be made in respect of other vectors that are transverse to the longitudinal axis 94, such as vector 92B which is perpendicular to an adjacent surface of the elongate member 66; the angle between vector 92B and the plane 51 remains substantially constant (zero) for all movements of the elongate member 66. The vector under consideration need not be perpendicular to the longitudinal axis 94, merely transverse to the longitudinal axis 94, but in all cases the angle between the chosen vector and the plane 51 remains substantially constant.

Constraining the angle of the traverse vector 92A, 92B with respect to the plane 51 defined by the constraint member 50 effectively locks the elongate member 66 against any rotation around its longitudinal axis 94, whilst still allowing angular movement between the elongate member 66 with respect to the upper and lower platforms 20, 40.

With the constraint member 50 being attached to the upper platform 20 via an attachment feature in the form of rotary joint 59, rotation of the plane 51 is enabled about attachment axis 59A defined by the rotary joint 59. This allows a generous freedom of movement to the extendable leg assemblies, and thereby also the moving (lower) platform 40, whilst still maintaining the plane 51 (and therefore encoder scale 10) in alignment with gravity 99. This ensures that the problem explained above with reference to FIG. 3 is overcome.

FIG. 12 is a schematic illustration of the elongate member 66 of the extendible leg assembly 60, showing in more detail how the scale 10 interacts with a scale reader. In particular, FIG. 12 illustrates how the scale 10 interacts (or cooperates) at a measurement location M with a scale reader 11 to provide a measurement relating to a length of the elongate member 66 (or equivalently of the extendable leg assembly 60). Such a measurement is used in this example to determine the position of the probe component 14 in the working volume.

The elongate member 66 comprises first and second elongate members 63 and 65 which move relative to one another when the extendable leg assembly 60 changes length. The first and second members 63, 65 have their respective longitudinal axes arranged substantially in line with one another, and slide over or past one another as the extendable leg assembly 60 extends and retracts. In the example shown in FIG. 12, the first member 63 slides telescopically inside the second member 65. The scale 10 is provided on or by the first member 63, with the scale reader 11 being provided on or by the second member 65.

The extendible leg assembly 60 is supported at first and second positions P1 and P2, which in this example are first and second ends of the extendible leg assembly 60, with the measurement location M being between the first and second positions P1 and P2. With this arrangement, the extendible leg assembly 60 is substantially unsupported (or self-supporting) at the measurement location M, so that it is subject as a result to gravitationally-induced bending at the measurement location M (and prone to the technical problems described above with reference to FIG. 3 were it not for the present invention).

Figure 3A:
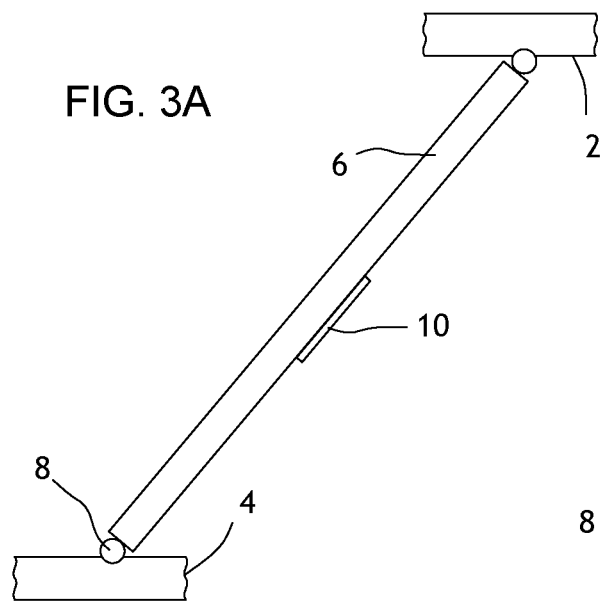
FIGS. 3A and 3B illustrate a problem associated with having an encoder scale affixed to a lower surface of an extendable leg of the non-Cartesian coordinate positioning machine of FIG. 1.
Figure 3B:
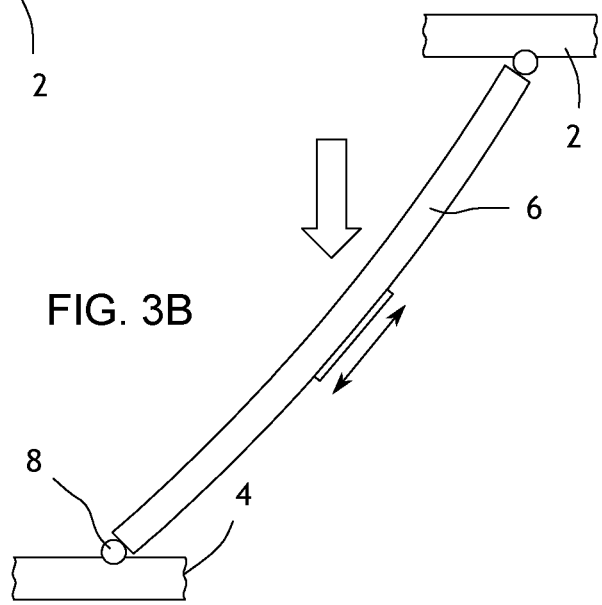

The measurement location M is spaced apart from both of the first and second positions P1 and P2, which is to be distinguished from a coordinate positioning device which provides support at or in the vicinity of the measurement location (and which therefore does not suffer from the sorts of problems described with reference to FIG. 3).

Figure 12A:
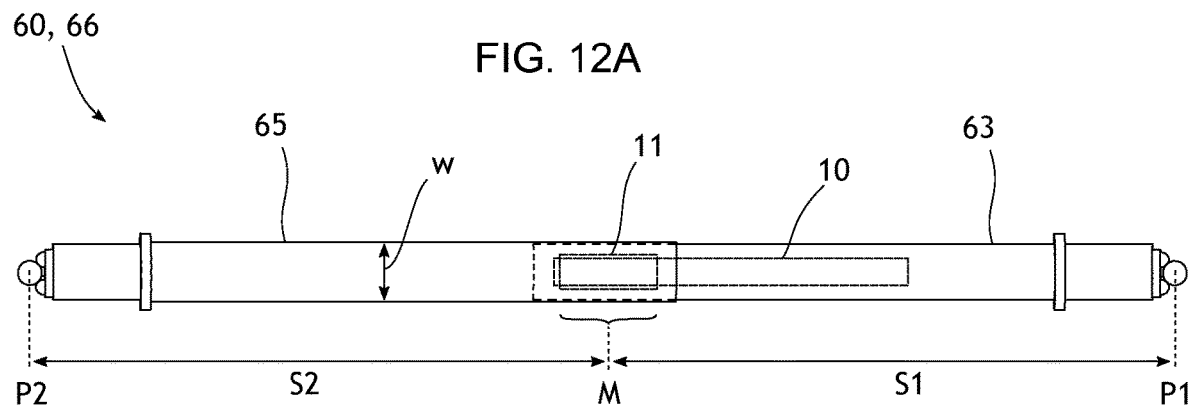
FIGS. 12A to 12C are schematic illustrations of the elongate member of the extendible leg assembly, showing in more detail how the scale interacts with a scale reader.
Figure 12B:
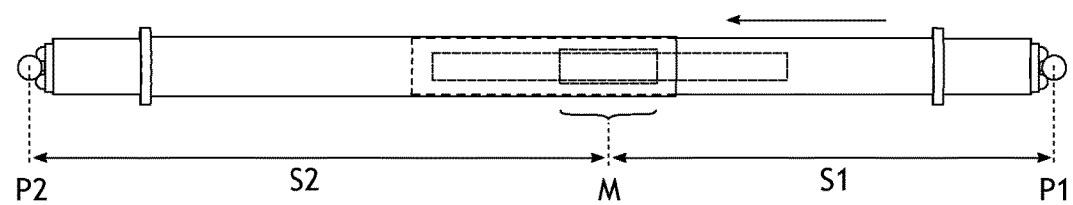
Figure 12C:
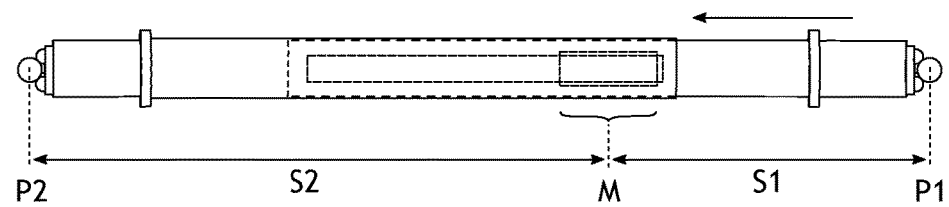

The spacing between the measurement location M and at least one of the first and second positions P1, P2 varies as the probe component 14 moves around the working volume (and as the length of the extendable leg assembly 60 varies). FIGS. 12A, 12B and 12C show the extendible leg assembly 60 with three different respective extensions, for three corresponding positions of the probe component 14 in the working volume.

In FIG. 12A, the extendible leg assembly 60 is fully extended, or at least as fully extended as the scale 10 and scale reader 11 will allow. In this respect, the scale reader 11 must be positioned over the scale 10 in order for the scale 10 to be readable and for a measurement to be taken. A spacing S1 between the measurement location M and the first position P1 is roughly equal to a spacing S2 between the measurement location M and the second position P2.

In FIG. 12B, the extendible leg assembly 60 is retracted somewhat, with the scale reader 11 having passed over around half of the length of the scale (or with the scale 10 having passed under the scale reader 11, depending on which end is moveable; both may be moveable too). The extendible leg assembly 60 is around half-extended. The spacing S2 is unchanged, since the measurement location M is determined by the position of the scale reader 11, which is affixed to the second member 65. The spacing S2 between the measurement location M and the second position P2 has reduced.

In FIG. 12C, the extendible leg assembly 60 is retracted further, to a fully retracted state; there is no further travel possible whilst still ensuring that the scale 10 and scale reader 11 are able to cooperate correctly to produce a measurement. Again, the spacing S2 is unchanged, while the spacing S2 has reduced further.

It can be seen that, particularly for the fully-extended configuration of FIG. 12A, there is a significant separation between the measurement location M and one or both positions P1 and P2.

For the fully-extended configuration of FIG. 12A, the measurement location M is spaced apart from both of the first and second positions P1 and P2 by around ten times a width 'W' of the elongate member 66, and the lack of support in the vicinity of the measurement location M results in noticeable bending and a noticeable effect on the metrology measurements from the encoder 10, 11. Expressed differently, the measurement location M is spaced apart from both of the first and second positions P1 and P2 by approximately half of the overall length (S1+S2) of the extendible leg assembly 60. As the extendible leg assembly 60 retracts, the spacing S1 reduces, but even in the fully-retracted configuration of FIG. 12C the measurement location M is spaced apart from both of the first and second positions P1 and P2 by at least approximately a third of the overall length (S1+S2) of the extendible leg assembly 60 (which is the smaller separation S1). It will of course be appreciated that the example of FIG. 12 is purely illustrative, and the range of movement and the relative spacings will vary from embodiment to embodiment. What is significant is that there the extendible leg assembly 60 is self-supporting in the vicinity of the measurement location M.

Although it is described above that the encoder scale 10 is affixed to the elongate member 66, the encoder scale could also form part of or be defined by the elongate member 66, for example formed directly in a surface of the elongate member 66.

It is also to be appreciated that the benefit of the present invention is not limited to the use of an encoder scale 10 applied to the elongate member 66 as described above. The invention would find benefit in any application that incorporates a metrology element that is potentially affected in the same way as described above. It is particularly beneficial where, like an encoder scale, the metrology element is substantially planar and is arranged substantially parallel to the plane defined by the constraint member 50.

Furthermore, it is not essential that all extendable leg assemblies in the coordinate positioning machine are provided (or associated) with a constraint member according to an embodiment of the invention; some benefit would be obtained even with one such extendable leg assembly being so provided, though clearly it is beneficial to have more than one, preferably all, provided (or associated) with a constraint member.

It has been described that the extendable leg assembly varies in length as the component moves around the working volume, and it is this variation in length that is used to position the component within the working volume (i.e. either measure the position of the component in the working volume, or set the position of the component in the working volume, or both). An embodiment of the present invention is to be distinguished from a non-Cartesian positioning device having a fixed-length arm that is moved through a fixed length-measuring element, with an encoder scale provided on the fixed-length arm for providing an indication of the position of the component.

Furthermore, although the predetermined part, whose orientation relative to gravity is carefully controlled in an embodiment of the present invention, is described above as being a length-measuring part, the present invention is applicable to other types of part that may be sensitive to orientation relative to gravity. In a different application, it is therefore conceivable that a property of the extendable leg assembly other than length is measured or otherwise determined by or using the predetermined part.

It should also be emphasised that the present invention is not limited to a constraint member 50 in the form of a multi-part hinge as illustrated, and other possible arrangements would be apparent to the skilled person. For example, another option for the constraint member 50 would be a single piece of plastic with formed thinned section creating the hinges. Also, with a constraint member of the type as illustrated in the appended drawings, there could be more or fewer joints provided than is illustrated.

In the above-described embodiment, the constraint member 50 is attached between the elongate member 66 and the support block 22 of the coordinate positioning machine 100, so that movement of the elongate member 66 is constrained relative to the coordinate positioning machine 100, with the constrained motion being defined by the constraint member 50 and its attachment to the support block 22 via the rotating joint 59. The support block 22 acts as an attachment feature and constitutes a 'further member' of the coordinate positioning machine 100. The constraint member 50 effectively ties the elongate member 66 to the further member to constrain motion of the elongate member 66 relative to the further member.

It is to be noted that it is not essential that the constraint members are provided at the connection between the extendable leg assemblies 60 and the upper platform 20, and could equally be provided instead at the connection between the extendable leg assemblies 60 and the lower platform 40, or both. There could even be a mixture of such arrangements amongst the extendable leg assemblies 60.

Also, the constraint member need not form a single assembly such as the hinged constraint member 50 described above, but may in fact consist of two or more separate assemblies that are each attached to the elongate member 66 and the further member in order to provide the required constraint.

It will be appreciated that other types of constraint member are suitable for providing a predetermined part (e.g. the encoder scale 10) of the extendable leg assembly 60 with substantially a same orientation relative to gravity for a same position of the component as the component moves around the working volume. For example, FIG. 13 illustrates a constraint member in the form of a weight 501 that is attached to and hangs from a lower surface of the upper tube 62, pulled in direction 99 by gravity. A point of attachment 503 for the weight 501 to the tube 62 is spaced away from the longitudinal axis 94 in a direction substantially parallel to the surface of the elongate member 66 on which the encoder scale 10 is affixed, and accordingly the weight 501 will act to maintain the encoder scale 10 in a fixed orientation relative to gravity (aligned with gravity).

The FIG. 13 embodiment shares the feature of the previously-described embodiment that the constraint member (weight) 501 defines a plane 51, and that rotation of the elongate member 66 (with encoder scale 10) is constrained relative to the plane 51. The plane 51 in this embodiment is defined by the position of the hanging weight 501 and the two ball joints at either end of the elongate member 66, or alternatively by the weight 501, the attachment point 503 and either of the ends of the elongate member 66. Operation of the constraint member 501 keeps the vector 92A (perpendicular to the surface of the elongate member 66 on which the encoder scale 10 is attached) aligned with vector 90 (perpendicular to the plane 51) and therefore keeps the encoder scale 10 substantially aligned with gravity.

FIGS. 14 and 15 provide a schematic illustration of the use of a constraint member in another embodiment of the present invention. This embodiment is useful where absolute accuracy is not the primary requirement for the machine but where repeatability is still very important. In this embodiment, the constraint member ensures repeatability by preventing the struts rotating without constraint about their primary (longitudinal) axis, so that a predetermined (orientation-sensitive) part of the extendable leg assembly has substantially a same orientation relative to gravity for a same position of the component within the working volume.

As in the above-described embodiment, the FIG. 14 embodiment provides a constraint member associated with the extendable leg assembly for providing a predetermined part of the extendable leg assembly with substantially a same orientation relative to gravity for a same position of the component in the working volume. The constraint member of FIG. 14 is also adapted to constrain rotation of the elongate member relative to a plane defined by the constraint member when the constraint member is attached to the elongate member and to the further member.

The constraint member 510 illustrated in FIG. 14 is generally of a similar type to the constraint member 50 illustrated in previous figures, and like reference numerals refer to like parts. However, the FIG. 14 embodiment differs from the previous embodiment in that in the FIG. 14 embodiment the 'further member' is in fact the elongate member 65 of another extendable leg assembly. The constraint member 510 of FIG. 14 is used effectively to tie an elongate member 66-1 of a first extendable leg assembly to an elongate member 66-2 of a second, adjacent, extendable leg assembly. The constraint member 510 is common or shared between the two elongate members 66-1, 66-2. As with the previous embodiment, the constraint member 510 of FIG. 14 defines a plane 51, but with the FIG. 14 embodiment the plane 51 defined by the constraint member 510 is substantially parallel with a plane defined by the two elongate members 66-1, 66-2, rather than being aligned with gravity. It is to be emphasised that the elongate members 66-1, 66-2 are only illustrated schematically in FIGS. 14 to 17, and the drawings are not intended to illustrate or imply any particular construction method or material used to form the elongate members 66-1, 66-2, nor any particular cross-sectional shape.

Other than the constraint member 510 being attached in use between two elongate members 66-1, 66-2 of the coordinate positioning machine, the main difference between the constraint member 510 of FIG. 14 and the constraint member 50 of previous figures is that the constraint member 510 of FIG. 14 is connected to the further member 66-2 via a fixed connection, rather than the rotary connection 59 of FIGS. 6 to 8, and does not therefore allow rotation of the plane relative to the further member 66-2, or indeed vice versa. The constraint member 510 of FIG. 14 therefore acts to prevent rotation of both elongate members 66-1, 66-2 about their respective longitudinal axes, whilst allowing angular movement between the elongate members 66-1, 66-2.

The embodiment of FIG. 14 is provides a constraint that ensures a repeatable but varying orientation for a predetermined part of the extendable leg assembly, and in particular an encoder scale. Although not shown in FIG. 14, the encoder scale would be arranged in relation to the elongate members 66-1, 66-2 in a similar as described with reference to FIG. 12. Although the orientation of the encoder scale relative to gravity will vary as the moveable component (e.g. probe) is moved around the working volume, the orientation will be the same for each visit to the same position in the working volume. When the machine is used as a comparator, this variation does not matter, because the same amount and type of bending will have been present for the same position when probing the reference part. It matters more that the amount and type of bending is repeatable, from probing the reference part to probing the actual part, and when moving around the working volume in general.

The presence of the constraint member is also useful where there is a heavy component attached to the outside of one or both of the elongate members 66-1, 66-2, such as a motor for extending the leg assembly. The force of gravity acting on the component will tend to rotate the elongate member 66-1, 66-2 around its longitudinal axis, i.e. relative to the plane defined by the constraint member 510.

Even in the absence of a metrology element such as an encoder scale that might be affected by such rotation, such rotation can still lead to problems. For example, a joint may be shared between two leg assemblies such that the leg assemblies are situated in close proximity at the joint; in this situation, any rotation of an elongate member about its longitudinal axis may cause the adjacent leg assemblies to clash with one another, which in turn can cause the leg assembly to lift slightly off the joint. This is likely to lead to measurement errors, or could even cause a leg assembly to come off the joint completely.

The use of a constraint member 510 in such a situation prevents such rotation about the longitudinal axis, or at least reduces such rotation to a desirable extent so that the risk of the ends of adjacent leg assemblies clashing is minimal.

FIGS. 16A and 16B illustrate an alternative to the constraint member of FIGS. 14 and 15. The constraint member 520 of FIGS. 16A and 16B comprises first and second constraint arms 522, 524 and first and second attachments 526, 528. The first and second constraint arms 522, 524 are substantially L-shaped and are connected slidably together by the first and second attachments 526, 528 (e.g. low-friction bushes) to form a generally rectangular shape. Opposite sides of the rectangular shape formed by the first and second constraint arms 522, 524 are held respectively by elongate members 66-1, 66-2, with the rectangular shape being free only to pivot or rotate about the longitudinal axis of the held side of the arm.

Due to the slidable connection between the first and second constraint arms 522, 524, the rectangular shape is extendible to allow angular movement between the elongate members 66-1, 66-2, but the rectangular shape braces either elongate member 66-1, 66-2 against rotation about their respective longitudinal axes. The constraint member 520 is arranged such that a plane defined by the rectangular shape formed by the constraint member 520 is substantially perpendicular to the plane defined by the elongate members 66-1, 66-2.

Therefore, as with the constraint member of FIGS. 14 and 15, the constraint member 520 of FIGS. 16A and 16B defines a plane 51 (see FIG. 16B), with the plane 51 also being substantially parallel with the plane defined by the two elongate members 66-1, 66-2. The presence of the constraint member 520 causes rotation of each elongate member 66-1, 66-2 to be constrained relative to the plane 51 defined by the constraint member 520.

FIGS. 17A and 17B illustrate another alternative to the constraint member of FIGS. 14 and 15. The constraint member 530 of FIGS. 17A and 17B comprises first and second (e.g. metal) constraint plates 532, 534. The first constraint plate 532 is fixed to one side of the second elongate member 66-2, and is magnetically preloaded into contact with a first bearing 536 on the opposite (first) elongate member 66-1. Similarly, the second constraint plate 534 is fixed to the other side of the first elongate member 66-1, and is magnetically preloaded into contact with a second bearing 538 on the opposite (second) elongate member 66-2.

Therefore the pair of elongate members 66-1, 66-2 has two plates 532, 534 and bearing mechanisms 536, 538 which work to resist twisting of the elongate members 66-1, 66-2 (rotation around their respective longitudinal axes) and hold them parallel. As with the constraint member of FIGS. 14 and 15, the constraint member 530 defines a plane 51 (see FIG. 17B) that is substantially parallel with a plane defined by the two elongate members 66-1, 66-2. The presence of the constraint member 530 causes rotation of each elongate member 66-1, 66-2 to be constrained relative to the plane 51 defined by the constraint member 530.

Reference has previously been made to WO 2007/144573, in which a coordinate positioning machine is provided with a metrology frame that is separate from the thrust frame. As mentioned, the separation of the load-bearing structure from the metrology structure applies to each of the six extendable legs, with each extendable leg being provided with have a load-bearing structure and a metrology structure, and with the metrology structure being mechanically isolated from the load-bearing structure. In such a case, a constraint member as described herein need only be associated with the metrology structure of each extendable leg assembly, for controlling the orientation of the metrology structure (for example, relative to gravity), though a constraint member can optionally also be associated with the load-bearing structure of each extendable leg assembly.

Although the non-Cartesian coordinate positioning machine illustrated in the appended drawings has six extendable leg assemblies, a non-Cartesian coordinate positioning machine embodying the present invention is of course not limited to having six extendable leg assemblies, with the number and configuration of extendable leg assemblies being determined by the application concerned.

Although an embodiment of the invention has been described mainly in the context of a coordinate measuring machine and a comparator, the invention is applicable more generally to any type of coordinate positioning machine, such as scanning machines, machine tools, robots, positioning devices (e.g. for optical components), prototype manufacturing machines and various other uses.

The invention claimed is:

1. A non-Cartesian coordinate positioning machine comprising
an extendable leg assembly for positioning a component within a working volume of the machine, and
a constraint member associated with the extendable leg assembly for providing a predetermined part of the extendable leg assembly with substantially a same orientation relative to gravity for a same position of the component within the working volume,
wherein the predetermined part is arranged on an elongate member of the extendable leg assembly, and is subject to stresses caused by bending of the elongate member due to gravity.

2. The machine as claimed in claim 1, wherein the constraint member is arranged to provide the predetermined part with a substantially constant orientation relative to gravity.

3. The machine as claimed in claim 1, wherein the orientation of the predetermined part is the orientation of a plane defined by the predetermined part.

4. The machine as claimed in claim 3, wherein the constraint member is arranged to maintain the plane substantially aligned with gravity, such that a normal to the plane is maintained substantially normal to gravity.

5. The machine as claimed in claim 1, wherein the constraint member is adapted to constrain rotation of the elongate member around its longitudinal axis.

6. The machine as claimed in claim 1, wherein the predetermined part is arranged to interact at a measurement location with a further part of the machine to provide a measurement signal.

7. The machine as claimed in claim 6, wherein the extendable leg assembly is supported by at least one support, and wherein the measurement location is spaced apart from the or each support.

8. The machine as claimed in claim 7, wherein the extendable leg assembly is supported by first and second supports, for example at first and second ends of the extendable leg assembly.

9. The machine as claimed in claim 1, wherein the extendable leg assembly comprises first and second elongate members which are arranged to move relative to one another when the extendable leg assembly changes length.

10. The machine as claimed in claim 9, wherein predetermined part is arranged to interact at a measurement location with a further part of the machine to provide a measurement signal, and wherein the predetermined part is provided by or on the first elongate member and the further part is provided by or on the second elongate member.

11. The machine as claimed in claim 1, wherein the constraint member comprises a plurality of hinged sections with substantially parallel hinge axes.

12. The machine as claimed in claim 1, comprising a plurality of such extendable leg assemblies and such a constraint associated with each of the plurality of leg assemblies.

13. The machine as claimed in claim 1, being a coordinate measuring machine.

14. The machine as claimed in claim 1, being a comparator.

15. A non-Cartesian coordinate positioning machine comprising,
an extendable leg assembly for positioning a component within a working volume of the machine, and
a constraint member associated with the extendable leg assembly for providing a predetermined part of the extendable leg assembly with substantially a same orientation relative to gravity for a same position of the component within the working volume, wherein:
the predetermined part is arranged to interact at a measurement location with a further part of the machine to provide a measurement signal,
the extendable leg assembly is supported by at least one support,
the measurement location is spaced apart from the or each support, and
for at least one position of the component in the working volume, the measurement location is spaced apart from at least a closest one of the at least one support by at least 10% of an overall length of the extendible leg assembly.

16. A non-Cartesian coordinate positioning machine comprising
an extendable leg assembly for positioning a component within a working volume of the machine, and
a constraint member associated with the extendable leg assembly for providing a predetermined part of the extendable leg assembly with substantially a same orientation relative to gravity for a same position of the component within the working volume,
wherein the predetermined part comprises a metrology element.

17. The machine as claimed in claim 16, wherein the metrology element comprises an encoder scale.

18. The machine as claimed in claim 16, wherein the metrology element is substantially planar, with a surface of the metrology element defining the plane of the predetermined part.

19. A non-Cartesian coordinate positioning machine comprising
an extendable leg assembly for positioning a component within a working volume of the machine, and
a constraint member associated with the extendable leg assembly for providing a predetermined part of t e extendable leg assembly with substantially a same orientation relative to gravity for a same position of the component within the working volume,
wherein the constraint member is adapted to constrain rotation of the predetermined part relative to a plane defined by the constraint member.

20. The machine as claimed in claim 19, wherein the constraint member is attachable to the elongate member and to a further member of the coordinate positioning machine, and wherein the constraint member is adapted to constrain rotation of the predetermined part relative to the plane defined by the constraint member when the constraint member is attached to the extendable leg assembly and to the further member.

21. The machine as claimed in claim 20, comprising first and second such extendable leg assemblies, and wherein the further member for the first leg assembly is the elongate member of the second leg assembly, with a common constraint member.

22. The machine as claimed in claim 20, wherein the further member is provided by an attachment feature on the machine.

23. The machine as claimed in claim 22, wherein the constraint member is adapted to allow rotation of the plane defined by the constraint member about an attachment axis defined by the attachment feature.

24. The machine as claimed in claim 23, wherein the attachment axis is parallel to the plane defined by the constraint member.

25. The machine as claimed in claim 22, wherein the constraint member is arranged in the machine with the attachment axis being substantially aligned with gravity.

26. The machine as claimed in claim 19, wherein the constraint member is arranged in the machine with the plane defined by the constraint member being substantially aligned with gravity.

27. The machine as claimed in claim 19, wherein the constraint member is adapted to maintain a substantially constant angle between the plane defined by the constraint member and a vector that is transverse to a longitudinal axis of the extendible leg assembly.

28. The machine as claimed in claim 19, wherein the predetermined part is spaced away from a longitudinal axis of the extendible leg assembly in a direction perpendicular to the plane defined by the constraint member.

29. The machine as claimed in claim 19, wherein the predetermined part is arranged substantially parallel to the plane defined by the constraint member.

30. A non-Cartesian coordinate positioning machine comprising
an extendable leg assembly for positioning a component within a working volume of the machine, and
a constraint member associated with the extendable leg assembly for providing a predetermined part of the extendable leg assembly with substantially a same orientation relative to gravity for a same position of the component within the working volume,
wherein the component comprises a measurement probe.

31. A constraint member for a non-Cartesian coordinate positioning machine having an extendable leg assembly for positioning a component within a working volume of the machine, wherein:
the constraint member is adapted to provide a predetermined part of the extendable leg assembly with substantially a same orientation relative to gravity for a same position of the component within the working volume, and
the predetermined part comprises a metrology element.

32. An extendable leg assembly for a non-Cartesian coordinate positioning machine, the extendable leg assembly comprising a constraint member as claimed in claim 31.

33. An extendable leg assembly for a non-Cartesian coordinate positioning machine, the extendable leg assembly comprising an elongate member, with an end of the elongate member being provided with a bearing arrangement having three contact points, or at least substantially point-like contact surfaces, for bearing against a fixed ball provided on the machine, where a plane defined by the contact points or areas is substantially perpendicular to a longitudinal axis of the elongate member.

\* \* \* \* \*